(12) United States Patent
Prasad

(10) Patent No.: US 8,491,694 B2
(45) Date of Patent: Jul. 23, 2013

(54) EFFICIENT PHOSPHATE GROUP FERTILIZERS

(75) Inventor: Durga Yandapalli Prasad, Rangareddy (IN)

(73) Assignee: Bijam Biosciences Private Limited (IN)

(*) Notice: Subject to any disclaimer, the term of this patent is extended or adjusted under 35 U.S.C. 154(b) by 36 days.

(21) Appl. No.: 12/939,938

(22) Filed: Nov. 4, 2010

(65) Prior Publication Data

US 2011/0162422 A1 Jul. 7, 2011

(30) Foreign Application Priority Data

Nov. 4, 2009 (IN) .............. 1024/CHE/2009
Sep. 27, 2010 (IN) .............. 2840/CHE/2010

(51) Int. Cl.
*C05F 11/02* (2006.01)

(52) U.S. Cl.
USPC .................. 71/24; 71/11; 71/33; 71/34

(58) Field of Classification Search
USPC ...................................... 71/11–63
See application file for complete search history.

(56) References Cited

U.S. PATENT DOCUMENTS

| | | | | |
|---|---|---|---|---|
| 3,264,084 A * | 8/1966 | Karcher | .............. | 71/24 |
| 4,069,034 A * | 1/1978 | Hoover | .............. | 71/33 |
| 4,440,560 A * | 4/1984 | Nakamura et al. | .............. | 71/24 |
| 5,393,317 A * | 2/1995 | Robinson | .............. | 71/12 |
| 2004/0065127 A1* | 4/2004 | Connell | .............. | 71/15 |

FOREIGN PATENT DOCUMENTS

WO WO 2008/053339 A2 5/2008

* cited by examiner

*Primary Examiner* — Wayne Langel
(74) *Attorney, Agent, or Firm* — Knobbe Martens Olson & Bear LLP

(57) ABSTRACT

An efficient phosphate fertilizer composition is provided, comprising organic material such as lignite treated with ammonia and phosphoric acid in various proportions to derive direct phosphate fertilizer or ammoniated phosphate.

15 Claims, 45 Drawing Sheets

Sample:P2

| Angle 2-Theta ° | d value Angstrom | Intensity % % |
|---|---|---|
| 3.012 | 29.31416 | 57.9 |
| 4.112 | 21.47344 | 53.0 |
| 6.486 | 13.61712 | 57.3 |
| 7.605 | 11.61561 | 42.6 |
| 8.846 | 9.98841 | 49.1 |
| 11.665 | 7.58040 | 49.8 |
| 12.401 | 7.13198 | 74.7 |
| 16.226 | 5.45832 | 48.8 |
| 17.078 | 5.18780 | 44.5 |
| 20.087 | 4.41694 | 72.7 |
| 20.851 | 4.25674 | 100.0 |
| 21.475 | 4.13454 | 82.7 |
| 22.595 | 3.93206 | 57.6 |
| 24.701 | 3.60136 | 68.5 |
| 26.605 | 3.34778 | 97.3 |
| 28.363 | 3.14420 | 52.0 |
| 29.101 | 3.06603 | 49.6 |
| 33.651 | 2.66122 | 29.9 |
| 39.033 | 2.30577 | 40.6 |
| 41.434 | 2.17753 | 38.0 |
| 45.203 | 2.00433 | 28.3 |
| 46.270 | 1.96056 | 32.2 |
| 47.980 | 1.89458 | 29.9 |
| 51.310 | 1.77918 | 26.3 |
| 55.347 | 1.65858 | 28.5 |
| 60.014 | 1.54027 | 24.1 |
| 61.350 | 1.50990 | 21.3 |
| 68.513 | 1.36846 | 21.8 |
| 76.320 | 1.24672 | 19.7 |
| 79.202 | 1.20843 | 14.3 |
| RN-20651-A8 | 8 | 11/1/2010 |

Figure 14B

| Angle | d value | Intensity % |
|---|---|---|
| 2-Theta ° | Angstrom | % |
| 12.344 | 7.16472 | 16.8 |
| 15.843 | 5.58919 | 37.4 |
| 16.641 | 5.32316 | 74.5 |
| 17.522 | 5.05734 | 100.0 |
| 17.908 | 4.94907 | 31.0 |
| 20.841 | 4.25890 | 24.6 |
| 21.481 | 4.13333 | 28.8 |
| 22.119 | 4.01551 | 31.8 |
| 23.637 | 3.76099 | 68.7 |
| 24.215 | 3.67246 | 14.3 |
| 26.512 | 3.35929 | 25.0 |
| 27.692 | 3.21880 | 41.1 |
| 28.384 | 3.14191 | 45.7 |
| 29.067 | 3.06960 | 86.6 |
| 31.967 | 2.79745 | 39.0 |
| 33.714 | 2.65639 | 20.1 |
| 35.259 | 2.54342 | 26.8 |
| 37.883 | 2.37304 | 12.7 |
| 39.109 | 2.30146 | 17.9 |
| 40.194 | 2.24180 | 7.7 |
| 45.118 | 2.00791 | 27.8 |
| 47.348 | 1.91840 | 14.4 |
| 57.473 | 1.60219 | 9.8 |
| 62.886 | 1.47667 | 5.9 |
| 66.125 | 1.41195 | 7.9 |
| RN-20651-A32 | 32 | 11/2/2010 |

Figure 15B

| Angle 2-Theta ° | d value Angstrom | Intensity % % |
|---|---|---|
| 15.936 | 5.55687 | 21.4 |
| 16.690 | 5.30750 | 84.2 |
| 17.614 | 5.03116 | 22.7 |
| 17.978 | 4.93006 | 25.1 |
| 21.541 | 4.12204 | 12.8 |
| 23.740 | 3.74492 | 55.5 |
| 24.311 | 3.65831 | 5.9 |
| 25.954 | 3.43023 | 6.8 |
| 26.576 | 3.35133 | 7.4 |
| 27.785 | 3.20818 | 14.6 |
| 28.455 | 3.13417 | 10.9 |
| 29.074 | 3.06882 | 100.0 |
| 32.052 | 2.79016 | 8.0 |
| 33.776 | 2.65160 | 18.1 |
| 35.318 | 2.53930 | 7.0 |
| 36.936 | 2.43172 | 5.2 |
| 37.541 | 2.39386 | 4.4 |
| 37.954 | 2.36878 | 11.6 |
| 45.208 | 2.00412 | 48.8 |
| 47.392 | 1.91671 | 4.4 |
| 51.610 | 1.76954 | 5.1 |
| 53.976 | 1.69742 | 5.6 |
| 57.514 | 1.60114 | 6.6 |
| 59.173 | 1.56015 | 3.1 |
| 60.109 | 1.53808 | 5.4 |
| 68.431 | 1.36990 | 5.1 |
| 70.866 | 1.32867 | 4.3 |
| 77.209 | 1.23457 | 2.9 |
| 78.486 | 1.21765 | 4.2 |
| RN-20651-A33 | 33 | 11/2/2010 |

Figure 16B

| Angle | d value | Intensity % |
|---|---|---|
| 2-Theta ° | Angstrom | % |
| 16.117 | 5.49489 | 82.5 |
| 16.952 | 5.22614 | 65.9 |
| 17.825 | 4.97213 | 43.2 |
| 18.155 | 4.88251 | 25.5 |
| 21.754 | 4.08216 | 17.1 |
| 22.365 | 3.97203 | 12.1 |
| 23.940 | 3.71416 | 58.5 |
| 24.427 | 3.64106 | 10.2 |
| 25.169 | 3.53539 | 10.6 |
| 26.701 | 3.33595 | 17.8 |
| 27.974 | 3.18697 | 35.2 |
| 28.667 | 3.11153 | 34.4 |
| 29.346 | 3.04101 | 100.0 |
| 31.933 | 2.80037 | 23.4 |
| 32.251 | 2.77344 | 16.5 |
| 33.988 | 2.63560 | 19.2 |
| 35.492 | 2.52726 | 20.6 |
| 37.022 | 2.42623 | 12.3 |
| 38.121 | 2.35879 | 13.3 |
| 39.339 | 2.28851 | 10.4 |
| 41.259 | 2.18632 | 6.3 |
| 43.902 | 2.06066 | 9.6 |
| 45.332 | 1.99893 | 39.2 |
| 50.738 | 1.79788 | 4.9 |
| 51.803 | 1.76341 | 9.6 |
| 52.682 | 1.73604 | 7.5 |
| 57.747 | 1.59524 | 9.4 |
| 63.331 | 1.46736 | 8.4 |
| 67.271 | 1.39067 | 5.6 |
| 68.541 | 1.36796 | 6.9 |
| 71.070 | 1.32537 | 9.2 |
| 76.172 | 1.24878 | 6.7 |
| 78.582 | 1.21641 | 7.0 |
| RN-20651-A34 | 34 | 11/2/2010 |

Figure 17B

| Angle 2-Theta ° | d value Angstrom | Intensity % % |
|---|---|---|
| 15.976 | 5.54302 | 35.8 |
| 16.792 | 5.27541 | 87.1 |
| 17.695 | 5.00825 | 92.8 |
| 18.036 | 4.91444 | 32.6 |
| 21.602 | 4.11042 | 12.5 |
| 22.175 | 4.00559 | 9.6 |
| 23.796 | 3.73625 | 78.2 |
| 26.043 | 3.41873 | 8.1 |
| 26.613 | 3.34674 | 32.8 |
| 27.831 | 3.20299 | 16.7 |
| 28.522 | 3.12696 | 14.6 |
| 29.197 | 3.05626 | 100.0 |
| 29.831 | 2.99267 | 5.1 |
| 30.168 | 2.96000 | 4.8 |
| 31.190 | 2.86530 | 6.0 |
| 31.804 | 2.81140 | 9.2 |
| 33.895 | 2.64254 | 23.7 |
| 35.375 | 2.53536 | 10.3 |
| 37.033 | 2.42555 | 5.1 |
| 38.051 | 2.36296 | 10.2 |
| 39.284 | 2.29159 | 15.4 |
| 39.874 | 2.25904 | 5.3 |
| 43.586 | 2.07486 | 5.8 |
| 45.281 | 2.00106 | 33.4 |
| 47.502 | 1.91254 | 4.9 |
| 50.258 | 1.81395 | 3.2 |
| 51.655 | 1.76810 | 5.5 |
| 52.565 | 1.73963 | 4.8 |
| 54.628 | 1.67869 | 5.2 |
| 57.605 | 1.59881 | 7.9 |
| 63.213 | 1.46981 | 6.5 |
| 66.048 | 1.41343 | 3.1 |
| 67.256 | 1.39093 | 2.9 |
| 70.970 | 1.32699 | 5.0 |
| 75.192 | 1.26260 | 2.8 |
| 75.991 | 1.25130 | 4.9 |
| 79.662 | 1.20260 | 3.5 |
| RN-20651-A35 | 35 | 11/2/2010 |

Figure 18B

| Angle 2-Theta ° | d value Angstrom | Intensity % % |
|---|---|---|
| 8.898 | 9.93020 | 23.2 |
| 12.506 | 7.07215 | 20.8 |
| 14.684 | 6.02775 | 16.8 |
| 16.288 | 5.43748 | 40.8 |
| 17.086 | 5.18535 | 77.6 |
| 17.975 | 4.93080 | 71.3 |
| 18.298 | 4.84446 | 72.0 |
| 20.390 | 4.35207 | 22.6 |
| 21.903 | 4.05463 | 52.9 |
| 22.562 | 3.93768 | 37.0 |
| 24.110 | 3.68826 | 70.1 |
| 25.202 | 3.53085 | 21.5 |
| 26.283 | 3.38810 | 29.4 |
| 26.888 | 3.31323 | 36.4 |
| 28.160 | 3.16636 | 49.1 |
| 28.802 | 3.09724 | 49.6 |
| 29.513 | 3.02416 | 100.0 |
| 32.436 | 2.75808 | 24.9 |
| 34.114 | 2.62613 | 26.3 |
| 35.677 | 2.51454 | 32.7 |
| 36.710 | 2.44614 | 25.1 |
| 37.263 | 2.41111 | 22.1 |
| 38.334 | 2.34617 | 27.9 |
| 39.457 | 2.28192 | 22.7 |
| 45.500 | 1.99191 | 48.6 |
| 47.687 | 1.90555 | 19.2 |
| 49.402 | 1.84333 | 17.4 |
| 50.552 | 1.80406 | 38.7 |
| 51.945 | 1.75891 | 16.4 |
| 52.812 | 1.73207 | 14.0 |
| 54.653 | 1.67798 | 20.6 |
| 57.870 | 1.59214 | 13.6 |
| 62.676 | 1.48111 | 16.2 |
| 66.368 | 1.40738 | 13.8 |
| 67.374 | 1.38880 | 16.7 |

| Angle 2-Theta ° | d value Angstrom | Intensity % |
|---|---|---|
| 15.942 | 5.55479 | 24.9 |
| 16.741 | 5.29146 | 33.6 |
| 17.615 | 5.03087 | 100.0 |
| 17.989 | 4.92698 | 26.3 |
| 20.998 | 4.22730 | 3.9 |
| 21.560 | 4.11839 | 11.1 |
| 22.265 | 3.98957 | 14.2 |
| 23.735 | 3.74566 | 28.4 |
| 24.290 | 3.66129 | 5.2 |
| 26.016 | 3.42226 | 8.6 |
| 26.520 | 3.35832 | 19.5 |
| 27.804 | 3.20610 | 19.3 |
| 28.500 | 3.12938 | 49.8 |
| 29.193 | 3.05660 | 36.2 |
| 31.823 | 2.80976 | 12.1 |
| 32.041 | 2.79115 | 13.7 |
| 33.811 | 2.64898 | 8.0 |
| 35.353 | 2.53690 | 12.6 |
| 36.907 | 2.43354 | 4.6 |
| 38.014 | 2.36520 | 4.4 |
| 39.209 | 2.29578 | 7.0 |
| 43.567 | 2.07570 | 5.1 |
| 45.218 | 2.00370 | 12.9 |
| 47.437 | 1.91502 | 4.0 |
| 48.605 | 1.87168 | 7.5 |
| 49.032 | 1.85638 | 5.5 |
| 51.649 | 1.76830 | 4.7 |
| 53.397 | 1.71445 | 3.0 |
| 53.905 | 1.69949 | 4.1 |
| 54.271 | 1.68890 | 5.1 |
| 57.552 | 1.60018 | 4.0 |
| 62.263 | 1.48994 | 2.6 |
| 67.850 | 1.38021 | 0.9 |

| Angle | d value | Intensity % |
|---|---|---|
| 2-Theta ° | Angstrom | % |
| 15.906 | 5.56750 | 29.0 |
| 16.667 | 5.31480 | 100.0 |
| 17.548 | 5.04984 | 59.8 |
| 17.943 | 4.93957 | 22.0 |
| 21.526 | 4.12484 | 14.2 |
| 23.704 | 3.75057 | 87.2 |
| 24.870 | 3.57720 | 8.8 |
| 25.931 | 3.43326 | 8.3 |
| 26.501 | 3.36067 | 9.6 |
| 27.727 | 3.21483 | 17.2 |
| 28.439 | 3.13596 | 13.5 |
| 29.080 | 3.06826 | 64.3 |
| 31.702 | 2.82021 | 9.9 |
| 33.764 | 2.65251 | 12.6 |
| 35.282 | 2.54181 | 8.8 |
| 37.915 | 2.37112 | 14.2 |
| 42.450 | 2.12770 | 4.6 |
| 45.156 | 2.00630 | 26.2 |
| 57.576 | 1.59957 | 5.0 |
| 63.063 | 1.47295 | 5.6 |
| 68.437 | 1.36979 | 5.2 |
| 74.166 | 1.27750 | 2.4 |
| RN-20651-A38 | 38 | 11/2/2010 |

Figure 21B

| Angle 2-Theta ° | d value Angstrom | Intensity % % |
|---|---|---|
| 15.880 | 5.57631 | 100.0 |
| 16.592 | 5.33871 | 72.9 |
| 17.472 | 5.07170 | 9.4 |
| 17.847 | 4.96595 | 8.9 |
| 21.412 | 4.14653 | 5.2 |
| 21.977 | 4.04124 | 5.6 |
| 23.654 | 3.75832 | 39.7 |
| 25.933 | 3.43302 | 11.2 |
| 27.639 | 3.22479 | 7.7 |
| 28.355 | 3.14497 | 6.4 |
| 28.990 | 3.07758 | 50.0 |
| 33.672 | 2.65957 | 12.5 |
| 35.235 | 2.54509 | 13.5 |
| 37.865 | 2.37415 | 6.6 |
| 45.055 | 2.01055 | 21.5 |
| 51.429 | 1.77535 | 2.3 |
| 57.428 | 1.60334 | 8.0 |
| 60.082 | 1.53870 | 2.9 |
| 71.360 | 1.32069 | 1.6 |
| RN-20651-A39 | 39 | 11/2/2010 |

Figure 22B

| Angle 2-Theta ° | d value Angstrom | Intensity % % |
|---|---|---|
| 10.132 | 8.72314 | 100.0 |
| 10.800 | 8.18503 | 31.1 |
| 11.699 | 7.55825 | 48.9 |
| 12.642 | 6.99652 | 76.5 |
| 14.716 | 6.01492 | 31.7 |
| 15.616 | 5.67022 | 36.6 |
| 19.774 | 4.48610 | 49.4 |
| 20.935 | 4.23987 | 66.9 |
| 23.872 | 3.72453 | 72.5 |
| 26.724 | 3.33309 | 66.6 |
| 29.280 | 3.04778 | 83.1 |
| 43.344 | 2.08588 | 26.9 |
| RN-20651-A40 | 40 | 11/2/2010 |

Figure 23B

NMR Instrumentation Details

Instrument manufacturer : Varian-USA Unity INOVA 1H frequency : 400 MHz

13C Frequency : 100 MHz

Spinning speed : 10 KHz

Cross polarization : Ramped cross polarization 1H pulse width : 2.9 μsec 13C pulse width : 3.5 μsec Cross polarization time : 500 μsec Recycle delay : 4 sec Number of scans : 512

Line broadening : 200 Hz

Figure 24

EFFICIENT PHOSPHATE GROUP FERTILIZERS

CROSS-REFERENCE TO RELATED APPLICATIONS

This application claims the benefit of priority under 35 U.S.C. §119(a)-(d) of Indian Application No. 1024/CHE/2009, filed Nov. 4, 2009, and of Indian Application No. 2840/CHE/2010, filed Sep. 27, 2010, the disclosures of which are hereby expressly incorporated by reference herein in their entireties and are hereby expressly made a portion of this application.

FIELD OF THE INVENTION

Efficient phosphate group fertilizers for use in the field of agriculture are provided. These efficient phosphate group fertilizers are useful for enhancement of significant crop yield.

BACKGROUND OF THE INVENTION

Phosphorous is a macronutrient and the source is from mines. When applied to soils, typically only a small amount of macronutrients will be available to plants as a majority of phosphorous is fixed in the soil due to various factors such as ion antagonism, etc.

SUMMARY OF THE INVENTION

Efficiency enhancement of phosphorous fertilizers is necessary for obtaining viable returns to farmers.

Lignite, referred to as brown coal, is the lowest rank of coal and is used almost exclusively as fuel for steam electric generation. Although there are attempts to produce value added products for other utilities, the major consumption of lignite is for power generation. Lignite, which is rich in carbon, is the result of decomposition of vegetation over millions of years ago which underwent compaction and heating. Because of its vegetative origin, this material is very rich in various functionally efficient organic molecules and it will be more beneficial to use these functionally efficient organic molecules present in lignite.

These functionally efficient organic molecules can be made more functionally efficient than normal organic molecules (humic, fulvic acids etc.) present in lignite or leonardite due to the enhanced reactive nature obtained by treating with hydrogen peroxide or alkaline hydrogen peroxide which are resultant of cleavage of lignite.

An efficient phosphate group based fertilizer composition which enhances the growth and yield of the crops is provided.

Also provided are phosphate group based fertilizer compositions with the property of releasing higher amounts of water soluble phosphorus to the plant.

Also provided are phosphate group based fertilizer compositions with the property of increasing the available phosphorus for the plant, with reduced elements typically observed in phosphate fertilizers.

Also provided are efficient phosphate group based fertilizer compositions with an organic based compound such as lignite, and a method of preparing such composition.

Also provided are methods of producing functionally efficient organic molecules from lignite which are beneficial for various applications in agriculture.

Also provided are fertilizer compositions of desired cleavage products of various molecular weights that are useful in deriving nutrients in agricultural utilities.

Accordingly, an efficient phosphate based fertilizer composition and a method of preparing the same is provided, as are products of chemical reactions, wherein organic material such as lignite (with or without treating with hydrogen peroxide) is mixed with ammonia and subsequently mixed/reacted with phosphoric acid/phosphates that have been mixed with lignite (with or without hydrogen peroxide treatment).

An advantage these new phosphate group fertilizers is that they protect phosphate from cationic binding and also enhance microbial growth, which is useful to make more phosphate available to plants.

BRIEF DESCRIPTION OF THE DRAWINGS

FIGS. 4-13 relate to comparative FTIR analysis of (Type)

FIGS. 14-23 relate to comparative XRD analysis of (Type) FIGS. 14A and 14B: lignite, (Type) FIGS. 15A and 15B: P2O5:N=27/13 NORMAL (Example 2), (Type) FIGS. 16A and 16B: P2O5:N=38/18 NORMAL (Example 3), (Type) FIGS. 17A and 17B: P2O5:N=27/13 COMPLETE (Example 5), (Type) FIGS. 18A and 18B: P2O5:N=38/18 COMPLETE (Example 6), (Type) FIGS. 19A and 19B: P2O5:N=27/13 PARTIAL (Example 7), (Type) FIGS. 20A and 20B: P2O5:N=38/18 PARTIAL (Example 8), (Type) FIGS. 21A and 21B: P2O5:N=27/13 AFTER (Example 9), (Type) FIGS. 22A and 22B: P2O5:N=38/18 AFTER (Example 10), (Type) FIGS. 23A and 23B: ORGANIC SSP 18% (Example 4).

FIG. 24 provides NMR Instrumentation Details for FIGS. 1-3.

DETAILED DESCRIPTION OF THE PREFERRED EMBODIMENT

Figure 1:
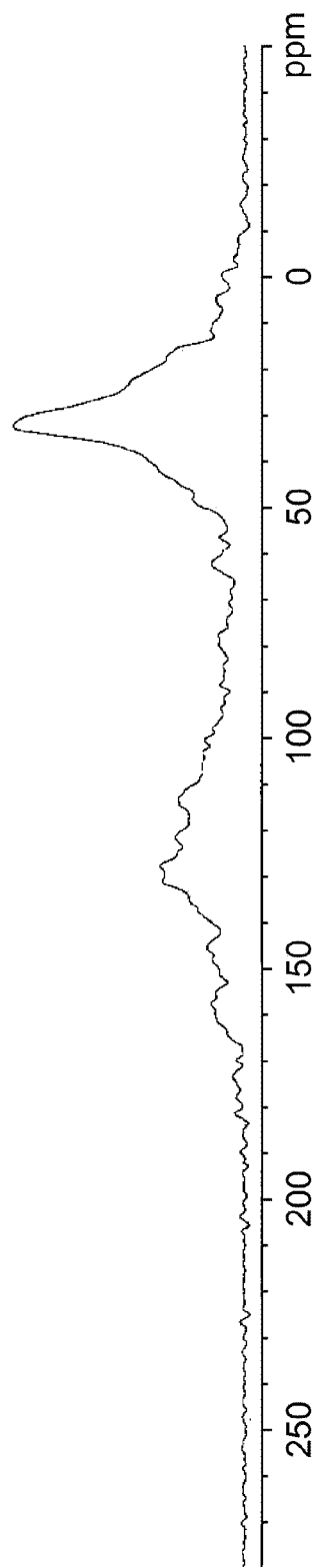
FIG. 1 shows Solid state NMR of phosphate fertilizer wherein P2O5:N is 38/18 manufactured by phosphoric acid with normal lignite and ammonia mixed with normal lignite as illustrated in Example 2.
Figure 2:
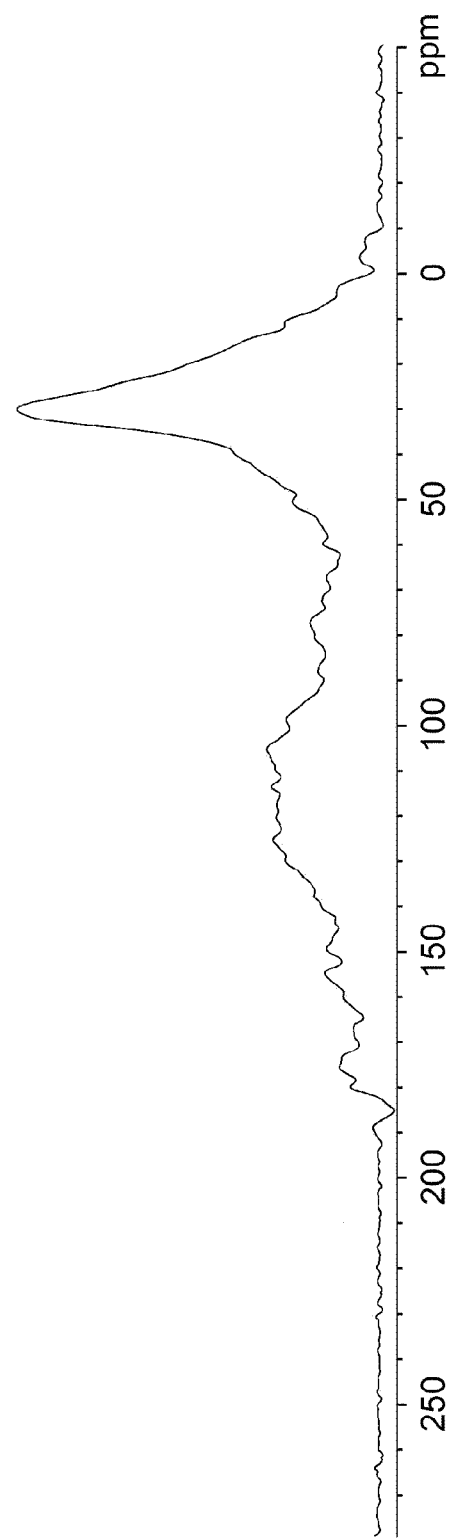
FIG. 2 shows Solid state NMR of phosphate fertilizer wherein P2O5:N is 38/18 manufactured by adding/reacting phosphoric acid with H2O2 treated lignite with ammonia mixed with normal lignite as illustrated in Example 8.
Figure 3:
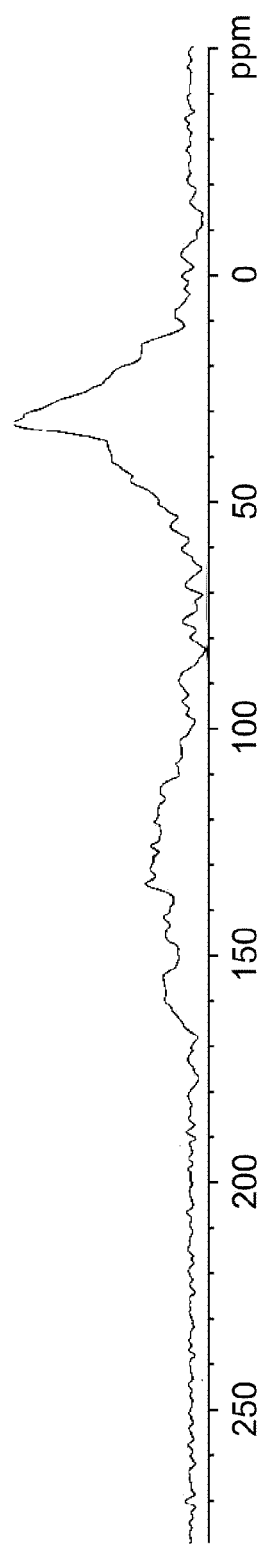
FIG. 3 shows Solid state NMR of phosphate fertilizer wherein P2O5:N is 38/18 manufactured by reacting phosphoric acid with H2O2 treated lignite with ammonia mixed with H2O2 treated lignite as illustrated in Example 6.
Figure 4A:
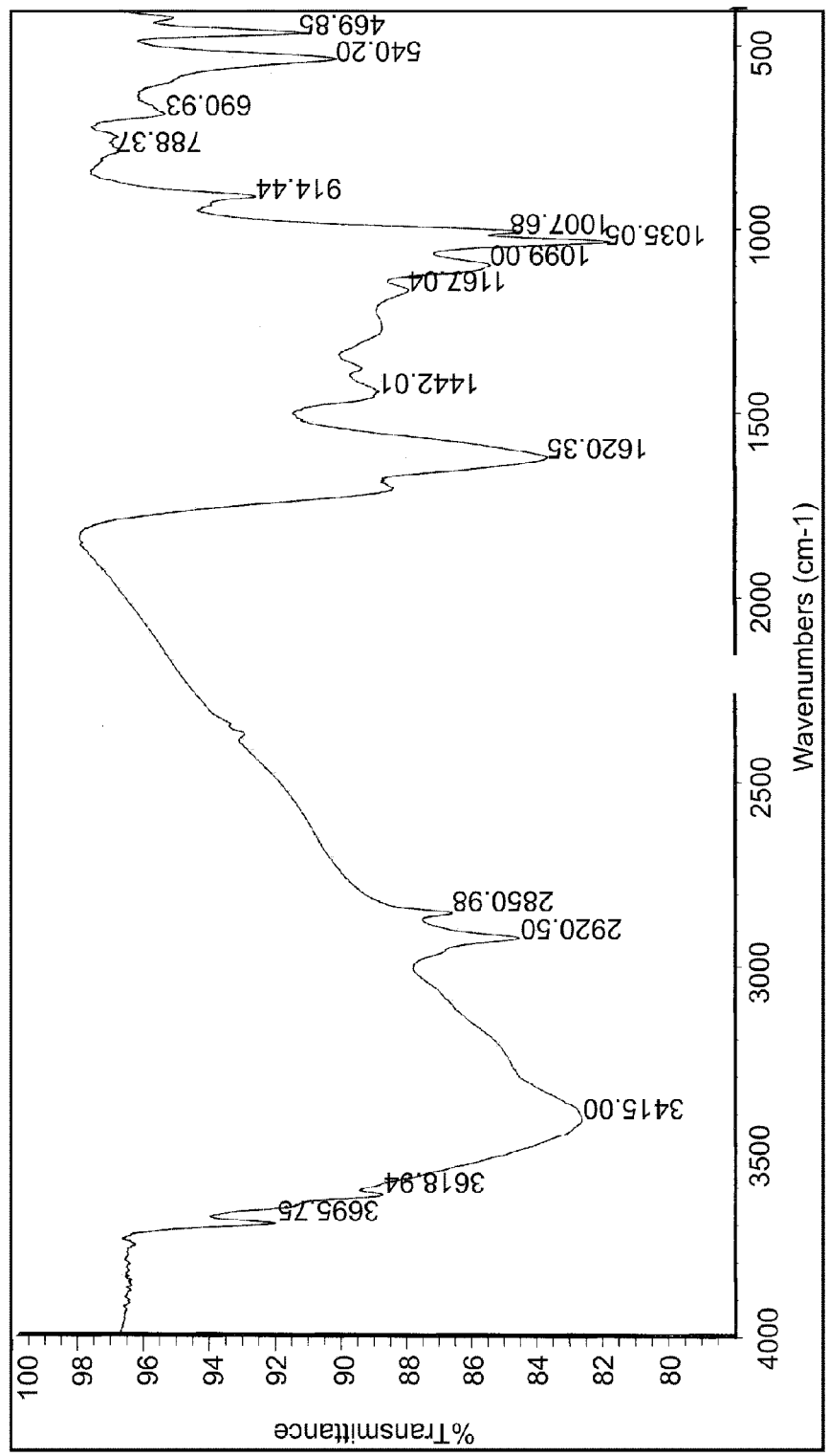
FIGS. 4A and 4B: lignite, (Type)
Figure 4B:
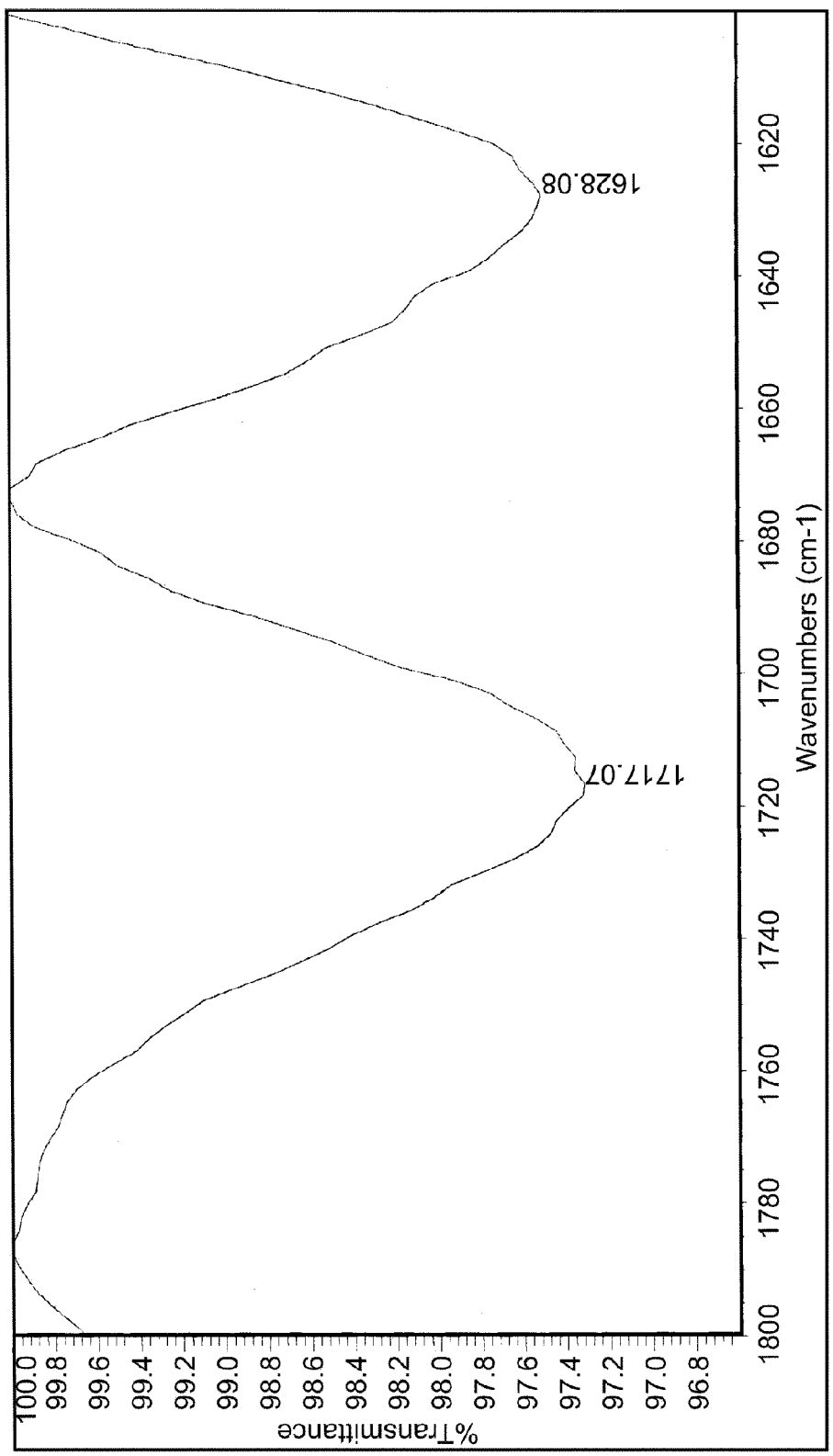
Figure 5A:
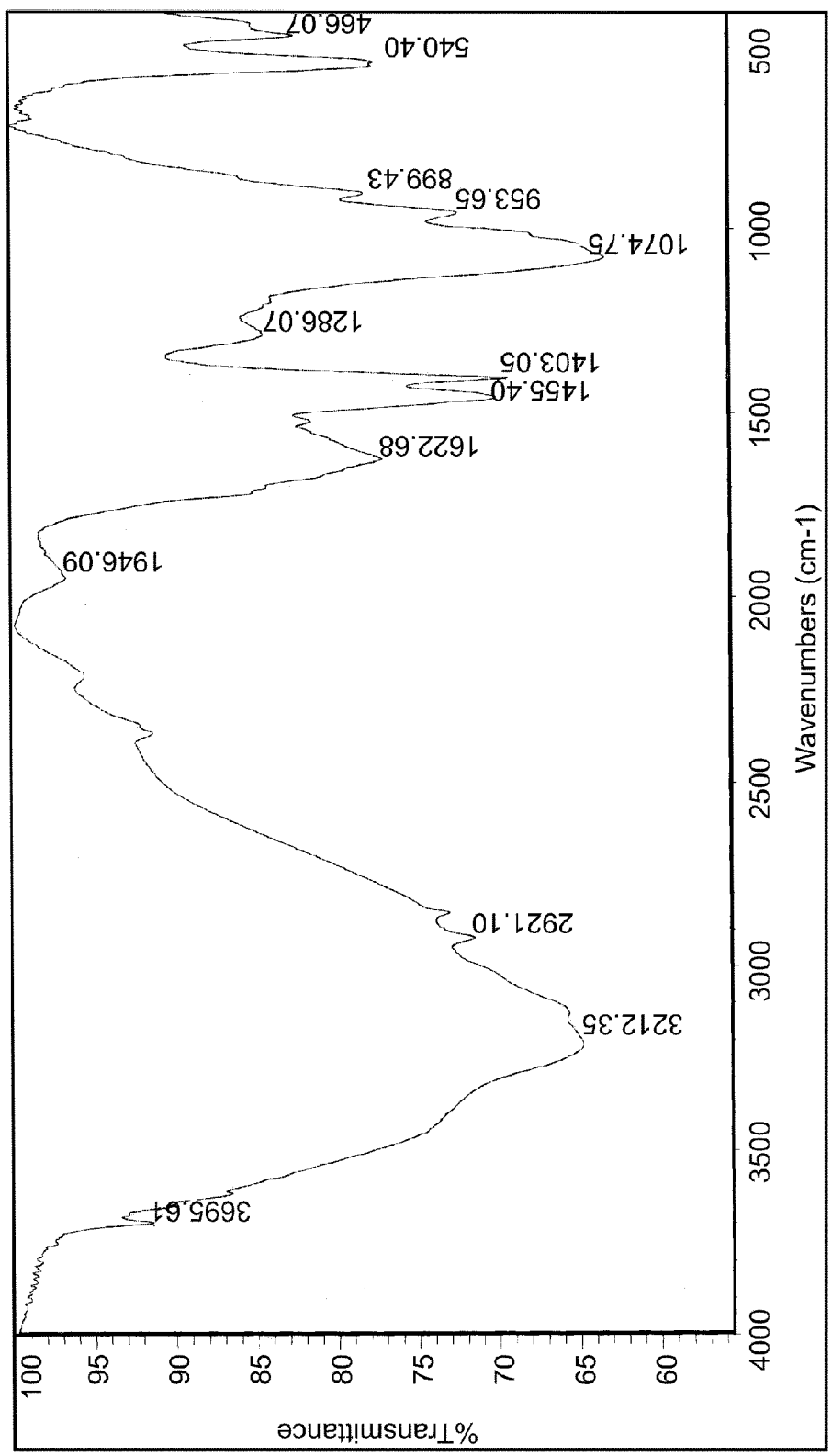
FIGS. 5A and 5B: P2O5:N=27/13 NORMAL (Example 2), (Type)
Figure 5B:
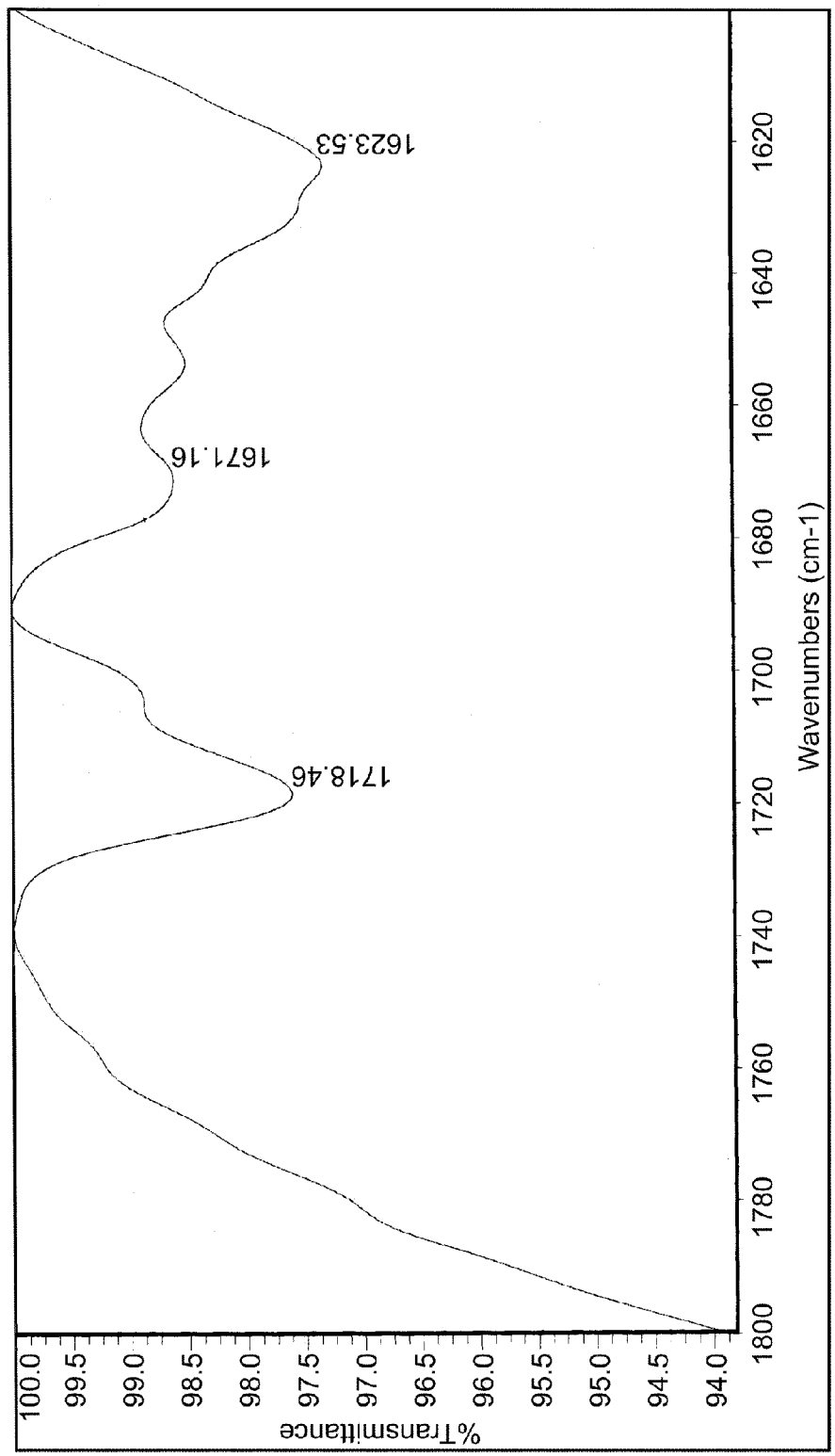

While the invention is susceptible to various modifications and alternative forms, specific aspects thereof has been shown by way of example in the illustrative examples and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

An efficient phosphate group fertilizer composition comprising organic material such as lignite treated with ammonia and phosphoric acid in various proportions to derive direct phosphate fertilizer or ammoniated phosphate is provided. The various constituents of phosphate fertilizer, which vary from crop to crop, can be modified in preferred embodiments. However, such modification should be construed within the scope and spirit of the preferred embodiments. Accordingly, the examples are showing only those specific details that are pertinent to understanding the aspects of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a setup, device that comprises a list of components does not include only those components but may include other components not expressly listed or inherent to such setup or device. In other words, one or more elements in a fertilizer composition or method proceeded by "comprises . . . a" does not, without more constraints, preclude the existence of other elements or additional elements in the composition or method. The following paragraphs explain preferred embodiments with respect to an efficient phosphate fertilizer composition comprising a combination of organic phosphate, ammoniated lignates, ammonium phosphates and organic ammonium phosphates, whereby the composition comprising ration of phosphorous and nitrogen in the range of 38:18 to 27:13. The preferred embodiments in respect of the same may be deduced accordingly.

Accordingly, the preferred embodiments relate to an efficient phosphate group fertilizer composition, e.g., an efficient phosphate group fertilizer composition comprising organic material such as lignite treated with ammonia and phosphoric acid in various proportions to derive direct phosphate fertilizer or ammoniated phosphate.

In a preferred embodiment, the composition has a ratio of water soluble phosphorous and nitrogen of from 38:18 to 27:13.

In a preferred embodiment, the composition comprises direct phosphate fertilizers having content of phosphorous of from 18% (single super phosphate) to 48% (triple super phosphate).

In a preferred embodiment, the lignite is optionally treated with one or more times with hydrogen peroxide ($H_2O_2$) to derive water soluble organic molecules below 5000 Dalton molecular weight with a yield of from 0.1 to 10% in 1:4 to 1:2 w/v water extraction.

In a preferred embodiment, the organic material (lignite substance) is organic solution of lignite cleavage.

In a preferred embodiment, the proportions of organic material (lignite substance), ammonia and phosphoric acid are from 1:1.5:0.5 to 10:5:3.

In a preferred embodiment, the phosphoric acid is selected or derived from orthophosphoric, rock phosphate, di-ammonium phosphate or single/triple super phosphate, complex fertilizers like 28:28(NP), 17:17:17(NPK) and urea ammonium phosphate.

In a preferred embodiment, the composition is pulverized to any desired size and incorporated as a plant nutrient.

In a preferred embodiment, the composition or plant nutrient increases available phosphorous to the plants by 10 to 50 times.

In a preferred embodiment, the composition enhances the growth of plants by 20 to 80%.

In a preferred embodiment, a method for preparing an efficient phosphate group fertilizer composition is provided, comprising the steps of: a) reacting the lignite substance with ammonia and subsequently mixing with phosphoric acid along with water in proportions in the range of 1:1.5:0.6:0.6 to 10:5:3:3; b) maintaining the pH of the mixture in the range of 6.0 to 7.5, in order to obtain slurry thereof; and c) drying the slurry and pulverizing the same up to desired size for obtaining the efficient phosphate fertilizer.

In a preferred embodiment, step a) mixing with lignite (after treating with hydrogen peroxide) containing 0.1-10% soluble organic molecules with ammonia as first part which was mixed with phosphoric acid as second part and mixing along with water in proportions in the range 1:1.5:0.6:0.6 to 10:5:3:3.

In a preferred embodiment, step a) mixing with normal lignite with ammonia which was mixed with hydrogen peroxide treated lignite (containing 0.1-10% soluble organic molecules) with phosphoric acid mixing along with water in proportions in the range of 1:1.5:0.6:0.6 to 10:5:3:3.

In a preferred embodiment, step a) mixing with lignite (after removal of soluble organic molecules (removal up to 10-90%) obtained by treating with hydrogen peroxide that contained 0.1-10% soluble organic molecules) with ammonia which was mixed with phosphoric acid mixing along with water in proportions in the range of 1:1.5:0.6:0.6 to 10:5:3:3.

In a preferred embodiment, a pH of 6-7 is obtained by adding ammonia or phosphoric acid.

Now the preferred embodiments will be described in detail so as to illustrate and explain various salient features.

One embodiment provides a novel phosphatic fertilizer with a property of releasing more water soluble or plant available phosphate compared to existing available phosphatic fertilizer such as, di ammonium phosphate and super phosphate.

Another embodiment produces existing phosphatic fertilizers with addition of organic molecule derived from lignite with efficient nutrient performance.

Another embodiment relates to a method of producing phosphatic fertilizes with very less toxic nature by avoiding translocation of toxic elements that normally present in phosphatic fertilizers.

Ortho-phosphoric acid was added to lignite after treatment of lignite with ammonia (25%). 5 kgs of lignite was treated with 6 liters of 25% of ammonium solution. After stirring well by addition of 3 liters of water, 3 liters of 85% ortho-phosphoric acid was added and pH was adjusted at 6.5 to 7.5.

Example 1

To produce phosphatic fertilizers, lower molecular weight organic molecules derived from lignite (see, e.g., PCT/IB2007/003324), are added either by addition to existing phosphatic fertilizer or adding to orthophosphoric acid or rock phosphate to produce efficient phosphate fertilizer. About 1-20% w/w of lower molecular weight organic molecules derived from lignite (below 5000 Daltons molecular weight) were added. Laboratory studies were made for estimation of water soluble phosphorous in soil at periodical intervals (24, 48, 96, 144, 168 and 216 hours after fertilizer treatment) with the above prepared products with corresponding controls (DAP and SSP). A quantity of 50 mg and 100 mg each product added to 100 g soil followed by 50 ml of water. For estimation of water soluble phosphorus, 2 ml of soil water suspension was taken and centrifuged. The supernatant liquid of 0.5 ml was taken and estimated the available phosphorus as per the procedure laid out by Olson et al. These above phosphatic fertilizers resulted in significant enhancement of available phosphorus (20-50%) in soil.

Example 2

To 1.0 kg of lignite, 1.44 liter of ammonium hydroxide was added in small quantities and mixed thoroughly. Mild ammonia vapors were released due to reaction and mixing. Lignite powder slowly became a paste and then a solution. 600 ml water was added to the mixture and thoroughly 600 ml phosphoric acid was added to the solution. The temperature of mixture increased 80 to 90° C. Acidic fumes were released due to reaction and mixing. The pH of the solution dropped to 6.75. Ammonium hydroxide was added to increase pH of the solution to 7.0-7.5. Product was dried to remove moisture and the powder was pulverized.

This product resulted in enhancement of crop yield in chillies up to 20%.

Example 3

To 1.0 kg of lignite, 4.0 liter of ammonium hydroxide was added in small quantities and mixed thoroughly. Mild ammonia vapors were released due to reaction and mixing. Lignite powder slowly became a paste and then a solution. 1300 ml water was added to the mixture and thoroughly 1300 ml phosphoric acid was added to the solution. The temperature of the mixture increased 80 to 90° C. Acidic fumes were released due to reaction and mixing. The pH of the solution dropped to 6.75. Ammonium hydroxide was added in quantities to increase pH of the solution to 7.0-7.5. Product was dried to remove moisture and the resulting powder was pulverized.

This product resulted in enhanced yield more than 25% over farmer recommendation on groundnut crop.

Example 4

To 1.0 kg of $H_2O_2$ sequentially treated lignite was added 320 ml of phosphoric acid in small quantities and mixed thoroughly. Lignite powder slowly became a thick paste which was dried and later pulverized to obtain fine powder.

This product resulted in enhanced yield more than 30% over farmer recommendation on groundnut crop.

Example 5

To 1.0 kg of $H_2O_2$ sequentially treated lignite, 1.44 liter of ammonium hydroxide was added in small quantities and mixed thoroughly. Mild ammonia vapors were released due to reaction and mixing. Lignite powder slowly became a paste and then a solution. 600 ml water was added to the mixture and thoroughly 600 ml phosphoric acid was added to the solution. The temperature of mixture increases 80 to 90° C. Acidic fumes were released due to reaction and mixing. The pH of the solution dropped to 6.75. Ammonium hydroxide was added to increase pH of the solution to 7.0-7.5. Product was dried to remove moisture and the resulting powder was pulverized.

This product resulted in enhanced yield more than 20% over farmer recommendation on rice crop.

Example 6

To 1.0 kg of $H_2O_2$ sequentially treated lignite, 4.0 liter of ammonium hydroxide was added in small quantities and mixed thoroughly. Mild ammonia vapors were released due to reaction and mixing. Lignite powder slowly became a paste and then a solution. 1300 ml water was added to the mixture and thoroughly 1300 ml phosphoric acid was added to the solution. The temperature of mixture increased 80 to 90° C. Acidic fumes were released due to reaction and mixing. The pH of the solution dropped to 6.75. Ammonium hydroxide was added to increase pH of the solution to 7.0-7.5. Product was dried to remove moisture and the powder pulverized.

This product resulted in enhanced yield more than 20% over farmer recommendation on rice crop.

Example 7

To 900 g of lignite, 1.44 liter of ammonium hydroxide was added in small quantities and mixed thoroughly. Mild ammonia vapors were released due to reaction and mixing. Lignite powder slowly became a paste and then a solution. 600 ml water was added to the mixture and thoroughly 600 ml phosphoric acid was added to the 100 gms of $H_2O_2$ sequentially treated lignite. The phosphoric acid mixed 100 gms of $H_2O_2$ sequentially treated lignite was mixed with the ammonium hydroxide containing 900 gm of lignite. The temperature of mixture increased 80 to 90° C. Acidic fumes were released due to reaction and mixing. The pH of the solution dropped to 6.75. Ammonium hydroxide was added to increase pH of the solution to 7.0-7.5. Product was dried to remove moisture and the powder pulverized.

This product resulted in enhanced yield more than 15% over farmer recommendation on rice crop.

Example 8

To 850 gm of lignite, 4.0 liter of ammonium hydroxide was added in small quantities and mixed thoroughly. Mild ammonia vapors were released due to reaction and mixing. Lignite powder slowly became a paste and then a solution. 1300 ml water was added to the mixture and thoroughly 1300 ml phosphoric acid was added to the 150 gms of $H_2O_2$ sequentially treated lignite. The phosphoric acid mixed 150 gms of $H_2O_2$ sequentially treated lignite was mixed to the ammonium hydroxide containing 850 gm of lignite. The temperature of mixture increased 80 to 90° C. Acidic fumes were released due to reaction and mixing. The pH of the solution dropped to 6.75. Ammonium hydroxide was added to increase pH of the solution to 7.0-7.5. Product was dried to remove moisture and the powder was pulverized.

This product resulted in enhanced yield more than 15% over farmer recommendation on rice crop.

Example 9

To 1.0 kg of dried organic residue (after extraction from $H_2O_2$ sequentially treated lignite), 1.44 lit of liter of ammonium hydroxide was added in small quantities and mixed thoroughly. Mild ammonia vapors were released due to reaction and mixing. Lignite powder slowly became a paste and then a solution. 600 ml water was added to the mixture and thoroughly 600 ml phosphoric acid was added to the solution. The temperature of mixture increased 80 to 90° C. Acidic fumes were released due to reaction and mixing. The pH of the solution dropped to 6.75. Ammonium hydroxide was added to increase pH of the solution to 7.0-7.5. Product was dried to remove moisture and the powder was pulverized.

This product resulted in enhanced yield more than 10% over farmer recommendation on rice crop.

Example 10

To 1.0 kg of dried organic residue (after extraction from H2O2 sequentially treated lignite), 4.0 liter of ammonium hydroxide was added in small quantities and mixed thoroughly. Mild ammonia vapors were released due to reaction and mixing. Lignite powder slowly became a paste and then a solution. 1300 ml water was added to the mixture and thoroughly 1300 ml phosphoric acid was added to the solution. The temperature of mixture increased 80 to 90° C. Acidic fumes were released due to reaction and mixing. The pH of the solution dropped to 6.75. Ammonium hydroxide was added to increase pH of the solution to 7.0-7.5. Product was dried to remove moisture and the powder was pulverized.

This product resulted in enhanced yield more than 25% over farmer recommendation on rice crop.

Example 11

To 1.0 kg of DAP, 250 ml of organic solution (containing 0.1 to 10% organic molecules) derived from lignite cleavage with $H_2O_2$, was mixed thrice sequentially, after drying each time sequentially and dried.

This product resulted in enhanced yield more than 25% over farmer recommendation on groundnut crop.

Example 12

To 1.0 kg of SSP, 250 ml of organic solution (containing 0.1 to 10% organic molecules) derived from lignite cleavage with $H_2O_2$, derived from lignite cleavage was mixed thrice sequentially, after drying each time sequentially and dried.

This product resulted in enhanced yield more than 50% over farmer recommendation on groundnut crop.

The above said tabular data is for indicative purpose only. However, one can not ensure the fertilizer composition which is suitable and providing best result for one crop will be equally suitable for other crops as well.

One of the advantages of the preferred embodiments is the development of an efficient phosphate based fertilizer composition which enhances the growth and yield of the crops.

Another advantage of the present phosphate based fertilizer composition is the property of releasing more amount of water soluble phosphorus to the plant.

Yet another advantage of the present phosphate based fertilizer composition is the property of increasing the available phosphorus for the plant.

Yet another advantage of the present phosphate based fertilizer composition is use of an organic based compound such as lignite, and a method of preparing such composition.

Yet another advantage is the use of the methods of preferred embodiments to produce eco friendly compositions.

The advantages can be achieved in an economical, practical, and facile manner. While preferred aspects and example configurations have been shown and described, it is to be understood that various further modifications and additional configurations will be apparent to those skilled in the art. It is intended that the specific embodiments and configurations herein disclosed are illustrative of the preferred nature of the invention, and should not be interpreted as limitations on the scope of the invention. While various embodiments of the invention have been described above, it should be understood that they have been presented by way of example only, and not by way of limitation. Although the disclosure is described above in terms of various exemplary embodiments and implementations, it should be understood that the various features and functionality described in one or more of the individual embodiments are not limited in their applicability to the particular embodiment with which they are described. They instead can be applied, alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. An efficient phosphate group fertilizer composition, comprising an organic material treated with ammonia and phosphoric acid, wherein:
   the fertilizer composition is a direct phosphate fertilizer or an ammoniated phosphate;
   the organic material comprises lignite; and
   the efficient phosphate group fertilizer has a ratio of water soluble phosphorous:nitrogen of from 38:18 to 27:13.

2. The efficient phosphate group fertilizer of claim 1, wherein the fertilizer is a direct phosphate fertilizer having a content of phosphorous of from 18% (single super phosphate) to 48% (triple super phosphate).

3. The efficient phosphate group fertilizer of claim 1, wherein the lignite is treated one or more times with $H_2O_2$ such that water soluble organic molecules having a molecular weight below 5000 Daltons are formed with a yield of from 0.1 to 10% in 1:4 to 1:2 w/v water extraction.

4. The efficient phosphate group fertilizer of claim 1, wherein the organic material is an organic solution of lignite cleavage.

5. The efficient phosphate group fertilizer of claim 1, having proportions of organic material:ammonia:phosphoric acid of from 1:1.5:0.5 to 10:5:3.

6. The efficient phosphate group fertilizer of claim 1, wherein the phosphoric acid is phosphoric acid or a derivative selected from the group consisting of orthophosphoric, rock phosphate, di-ammonium phosphate, single super phosphate, triple super phosphate, 28:28(NP) complex fertilizers, 17:17:17(NPK) complex fertilizers, urea ammonium phosphate, and combinations thereof.

7. The efficient phosphate group fertilizer of claim 1, wherein the fertilizer is pulverized and configured to be incorporated as a plant nutrient.

8. The efficient phosphate group fertilizer of claim 1, configured to increase available phosphorous to plants by 10 to 50 times.

9. The efficient phosphate group fertilizer of claim 1, configured to enhance growth of plants by 20 to 80%.

10. A method for preparing an efficient phosphate group fertilizer composition, comprising:
    a) reacting a lignite substance with ammonia and subsequently mixing with phosphoric acid along with water in proportions of from 1:1.5:0.6:0.6 to 10:5:3:3 of lignite:ammonia:phosphoric acid:water,
    b) maintaining a pH of the mixture in a range of from 6.0 to 7.5, whereby a slurry is obtained;
    c) drying the slurry and pulverizing the dried slurry, such that an efficient phosphate group fertilizer having a ratio of water soluble phosphorous:nitrogen of from 38:18 to 27:13 is obtained.

11. The method of claim 10, wherein step a) comprises treating lignite with hydrogen peroxide, whereby a treated lignite containing 0.1-10% soluble organic molecules is obtained, then mixing the treated lignite with ammonia as a first part, wherein the first part is subsequently mixed with phosphoric acid as second part, and wherein the second part is subsequently mixed with water, wherein proportions of lignite:ammonia:phosphoric acid:water are from 1:1.5:0.6:0.6 to 10:5:3:3.

12. The method of claim 10, wherein step a) comprises mixing lignite with ammonia, then mixing in hydrogen peroxide treated lignite containing 0.1-10% soluble organic molecules with phosphoric acid along with water in proportions of from 1:1.5:0.6:0.6 to 10:5:3:3 of lignite:ammonia:phosphoric acid:water.

13. The method of claim 10, wherein step a) comprises removing up to 10-90% soluble organic molecules from hydrogen peroxide treated lignite and mixing the resulting treated lignite with ammonia, phosphoric acid and water in proportions of from 1:1.5:0.6:0.6 to 10:5:3:3 of lignite:ammonia:phosphoric acid:water.

14. The method of claim 10, wherein a pH of 6-7 is maintained by adding ammonia or phosphoric acid.

15. An efficient phosphate group fertilizer composition, comprising an organic material treated with ammonia and phosphoric acid, wherein:
- the fertilizer composition is a direct phosphate fertilizer or an ammoniated phosphate;
- the organic material comprises $H_2O_2$ sequentially treated lignite;
- the efficient phosphate group fertilizer has a ratio of water soluble phosphorous:nitrogen of from 38:18 to 27:13; and
- the efficient phosphate group fertilizer having proportions of organic material:ammonia:phosphoric acid of from 1:1.5:0.5 to 10:5:3.

* * * * *

UNITED STATES PATENT AND TRADEMARK OFFICE
CERTIFICATE OF CORRECTION

PATENT NO.         : 8,491,694 B2                           Page 1 of 1
APPLICATION NO.    : 12/939938
DATED              : July 23, 2013
INVENTOR(S)        : Durga Yandapalli Prasad It is certified that error appears in the above-identified patent and that said Letters Patent is hereby corrected as shown below:

In the Drawings

Figure 6A:
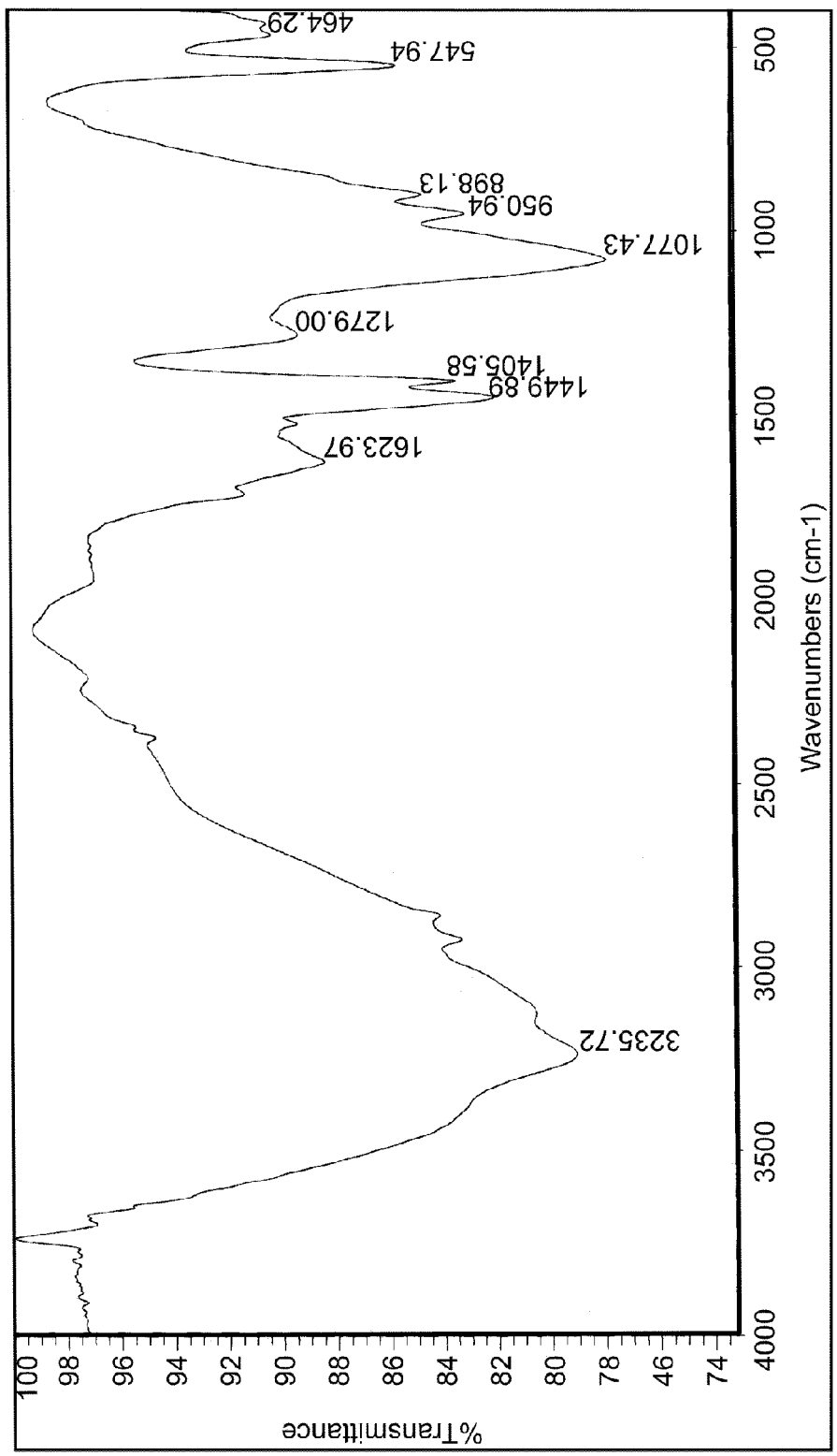
FIGS. 6A and 6B: P2O5:N=38/18 NORMAL (Example 3), (Type)
Figure 6B:
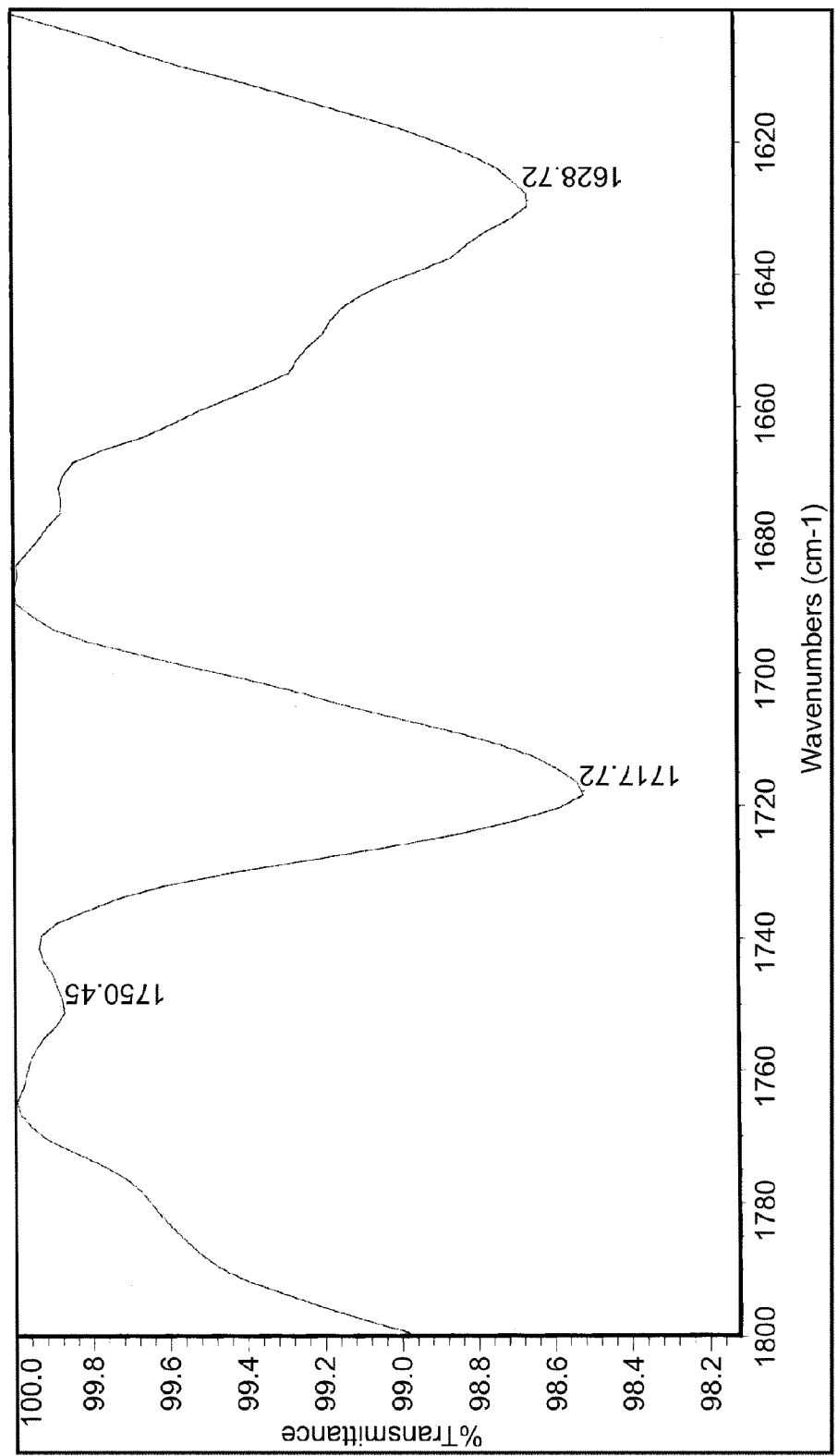
Figure 7A:
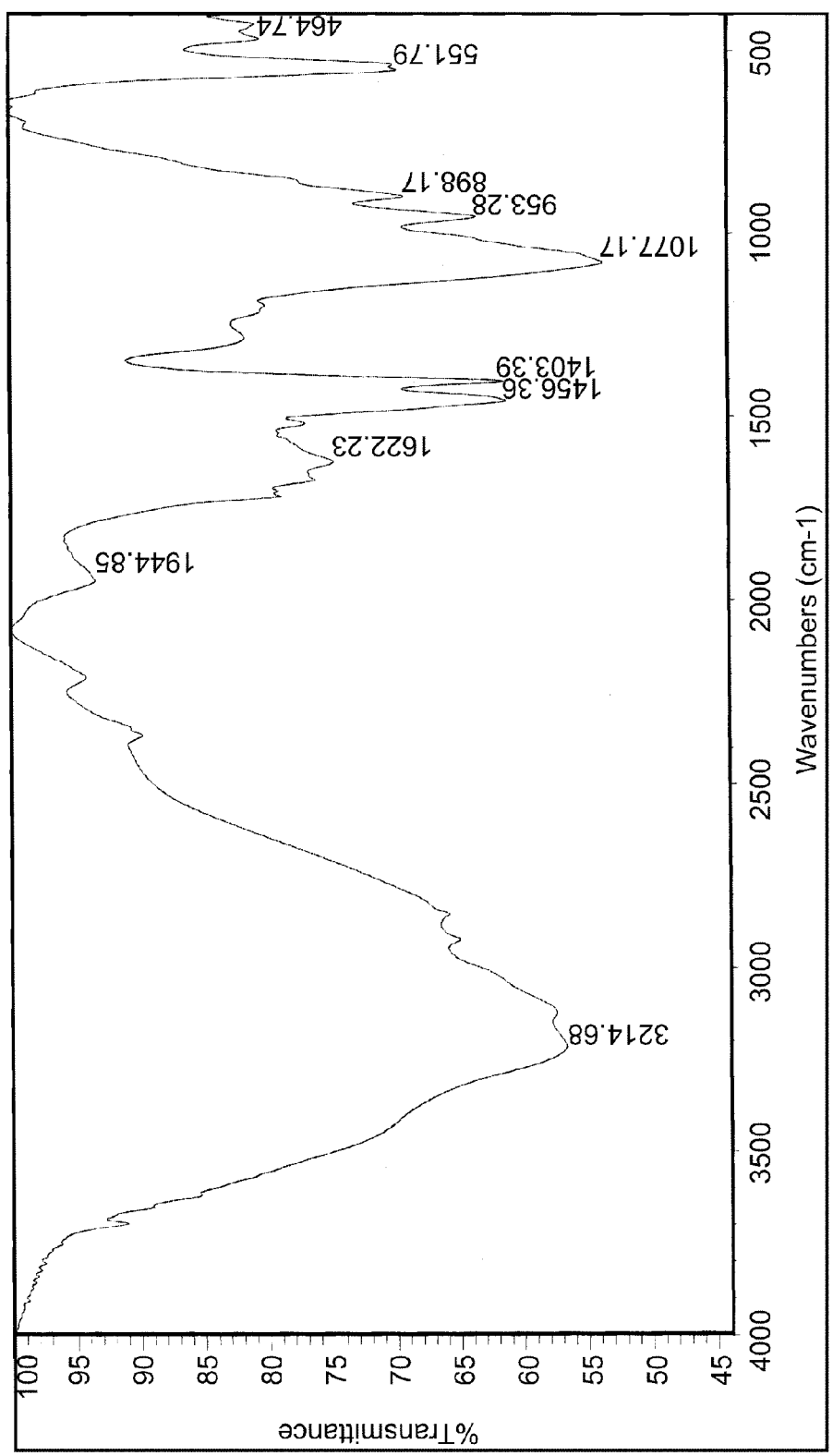
FIGS. 7A and 7B: P2O5:N=27/13 COMPLETE (Example 5), (Type)
Figure 7B:
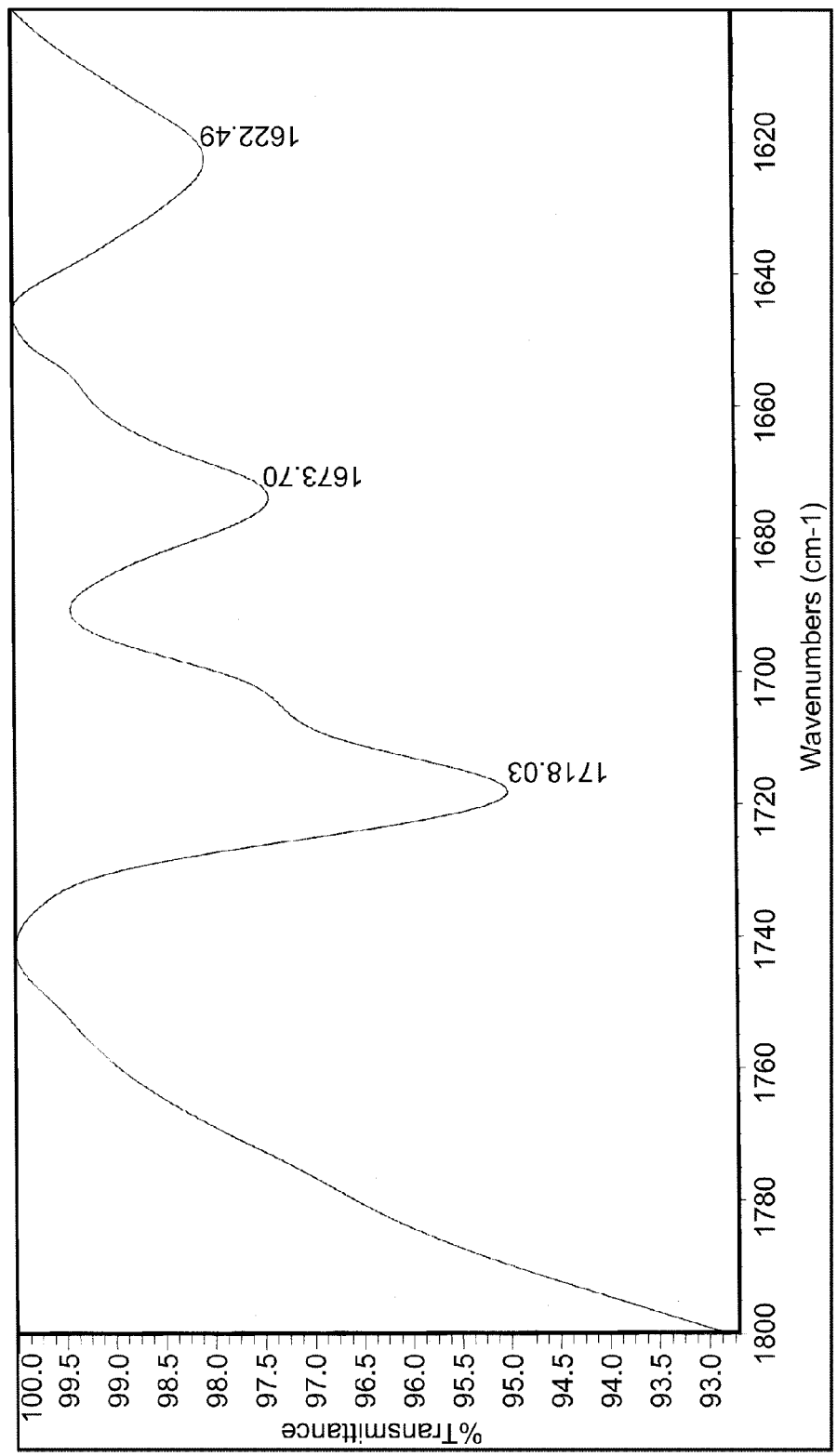
Figure 8A:
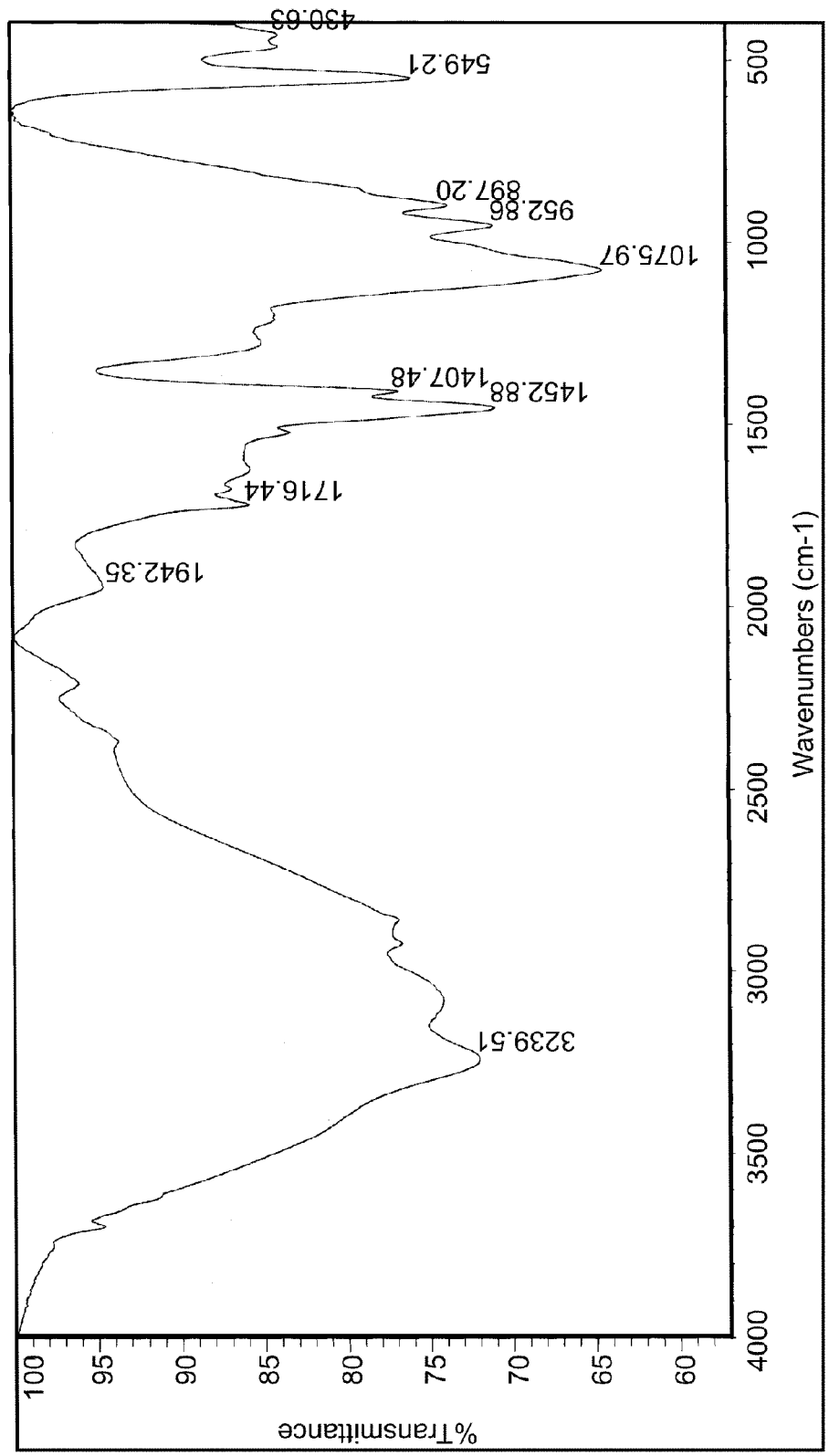
FIGS. 8A and 8B: P2O5:N=38/18 COMPLETE (Example 6), (Type)
Figure 8B:
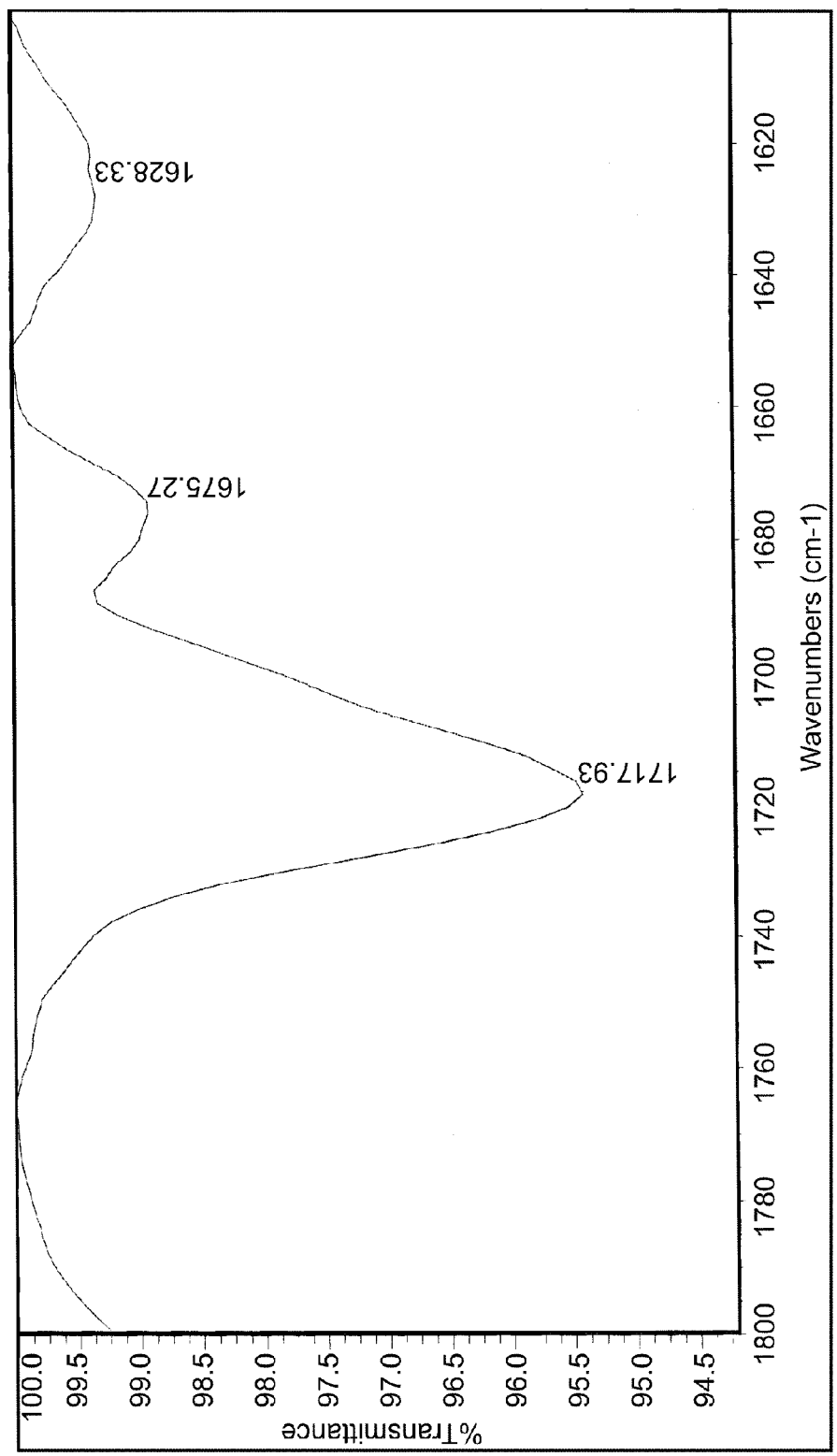

On Sheet 8 of 45 (FIG. 6A), at Line 13 (y-axis), please change "46" to --76--.

Figure 9A:
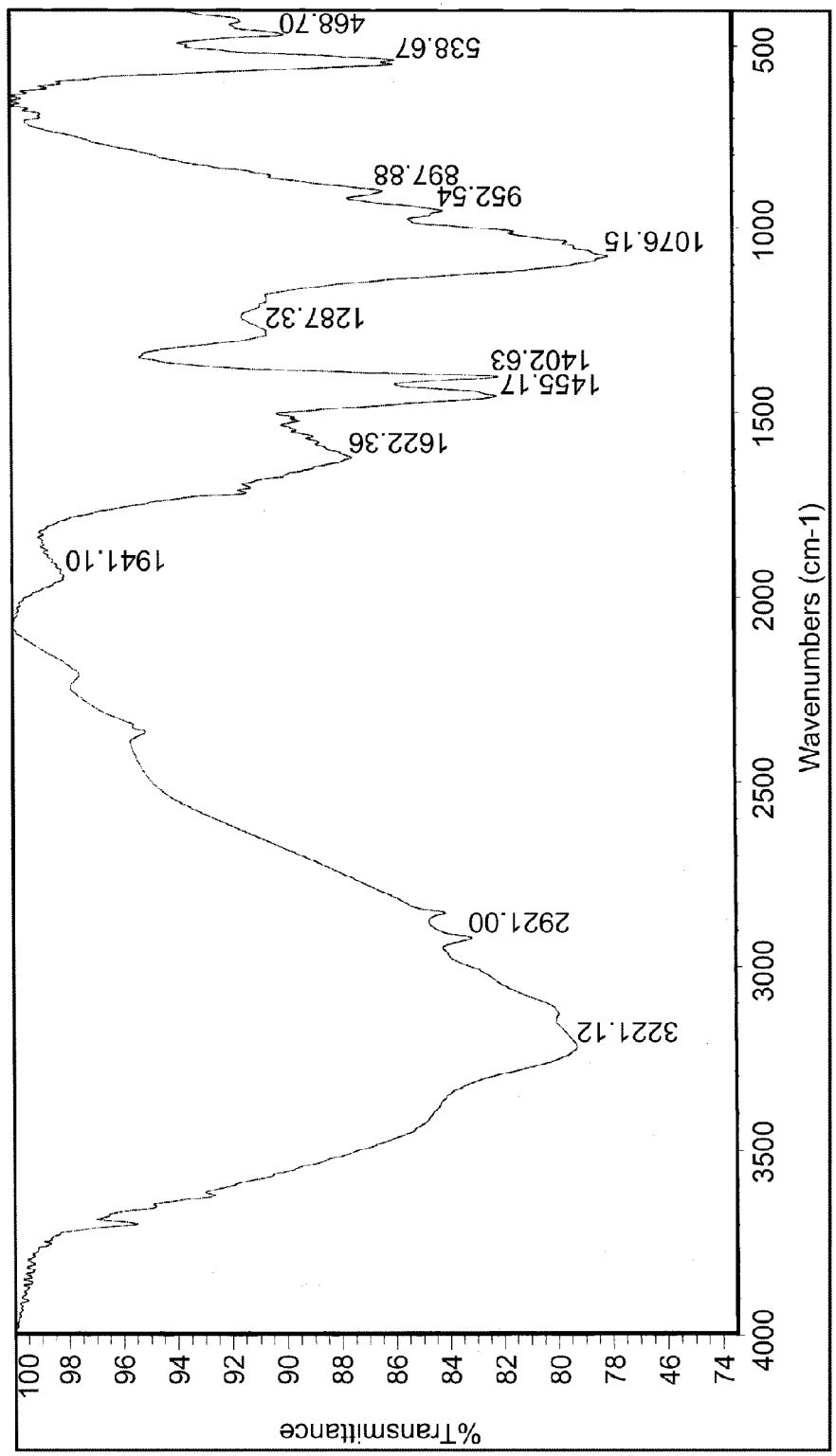
FIGS. 9A and 9B: P2O5:N=27/13 PARTIAL (Example 7), (Type)
Figure 9B:
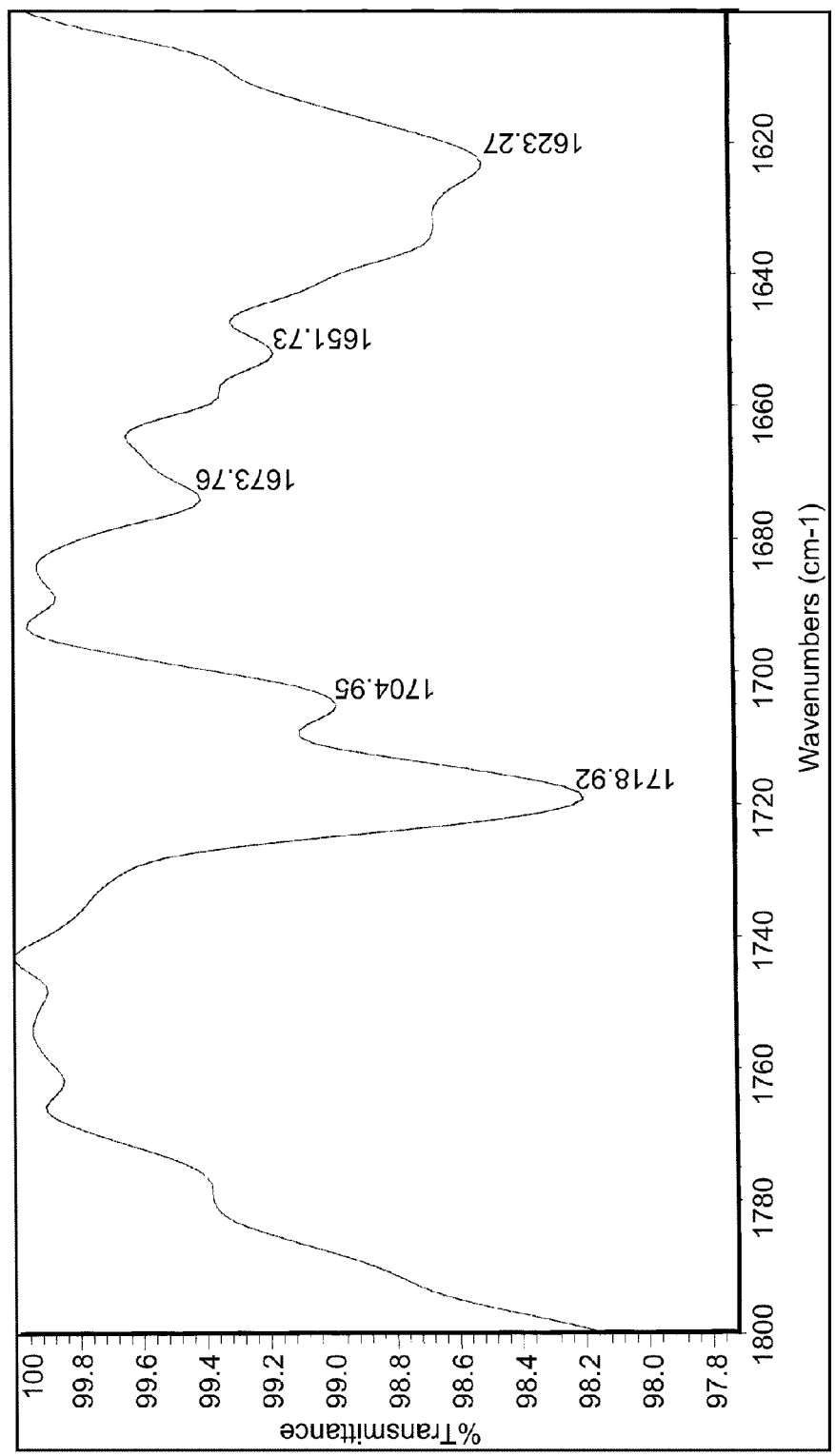

On Sheet 14 of 45 (FIG. 9A), at Line 13 (y-axis), please change "46" to --76--.

Figure 10A:
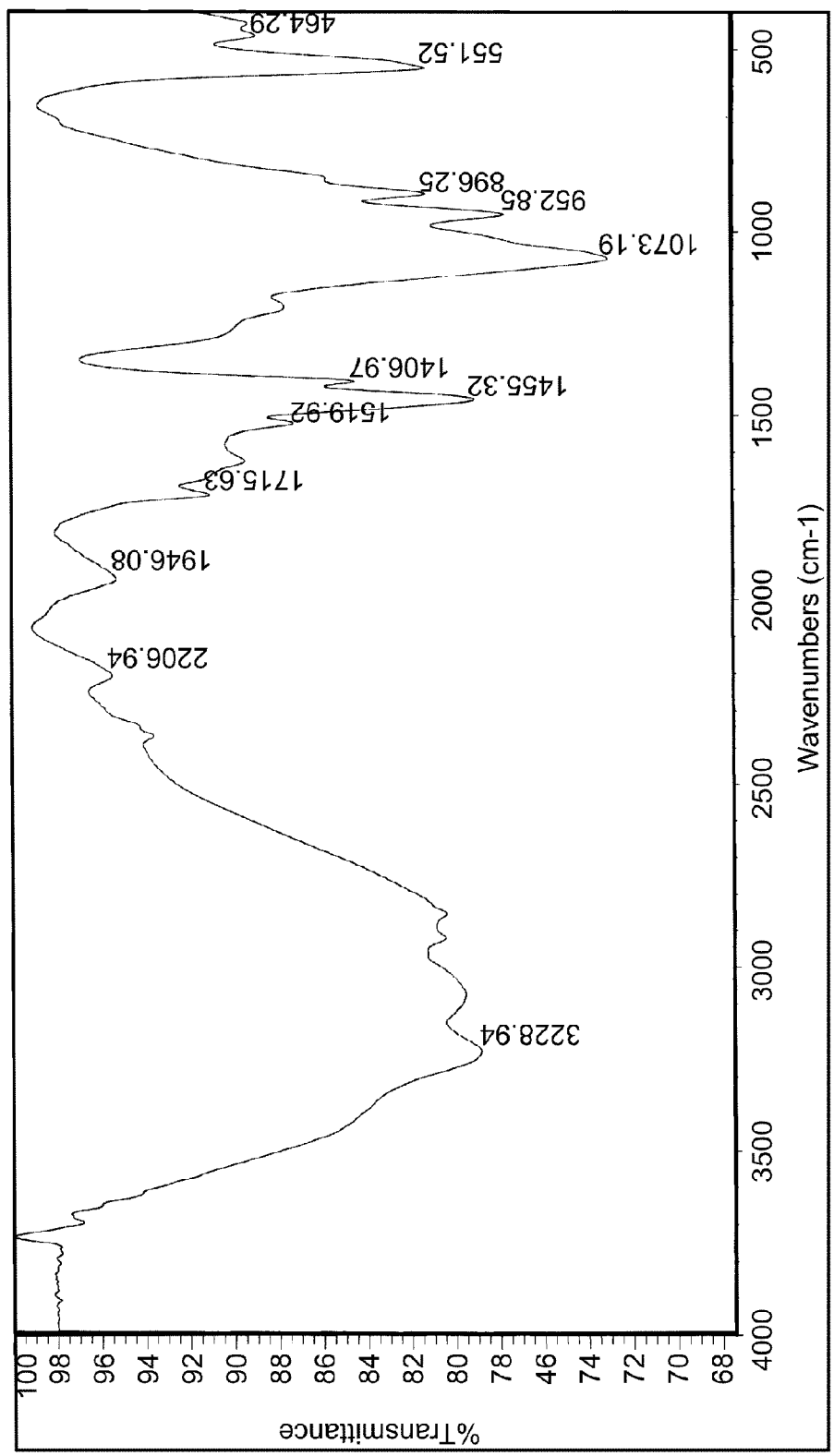
FIGS. 10A and 10B: P2O5:N=38/18 PARTIAL (Example 8), (Type)
Figure 10B:
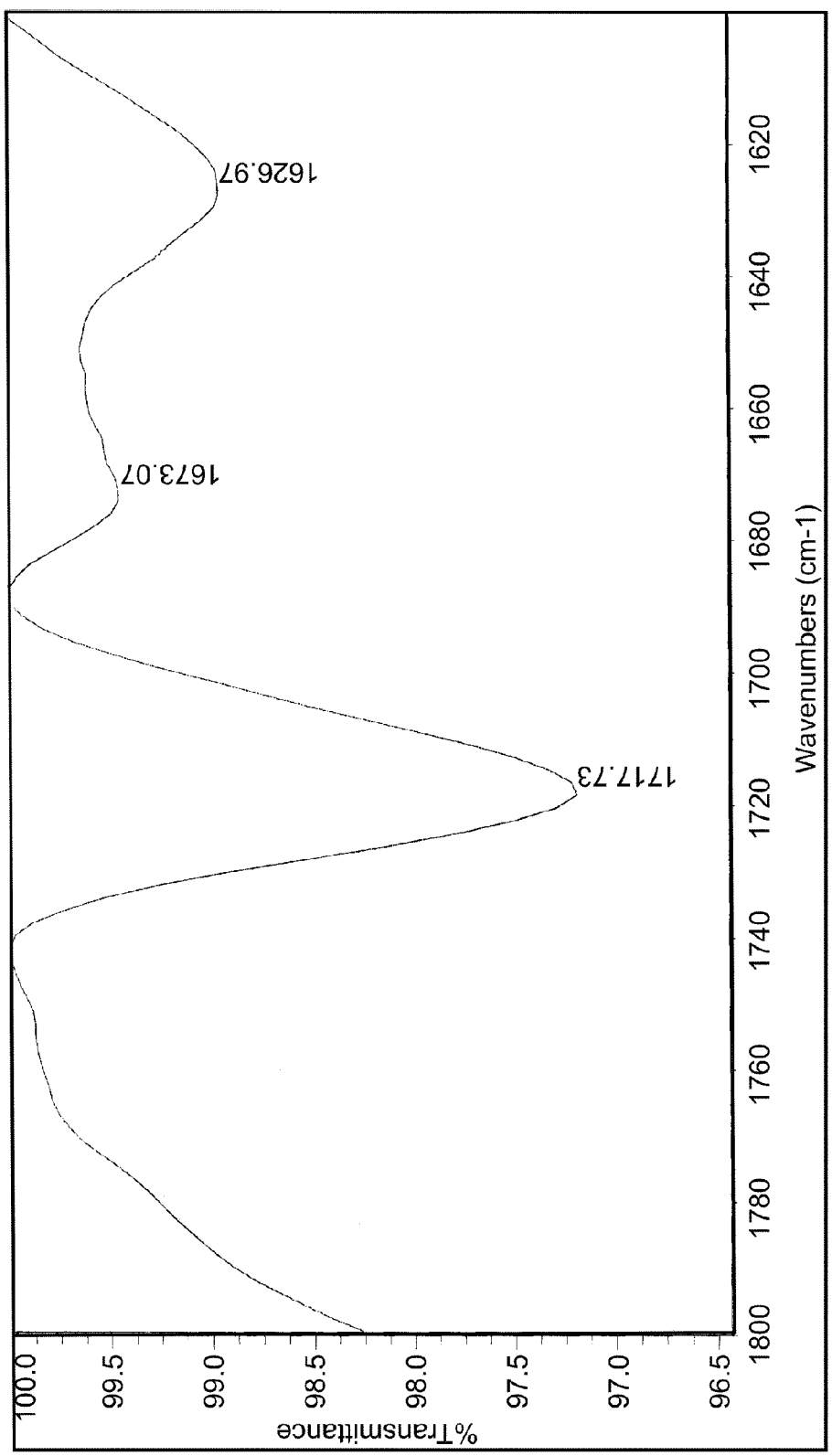
Figure 11A:
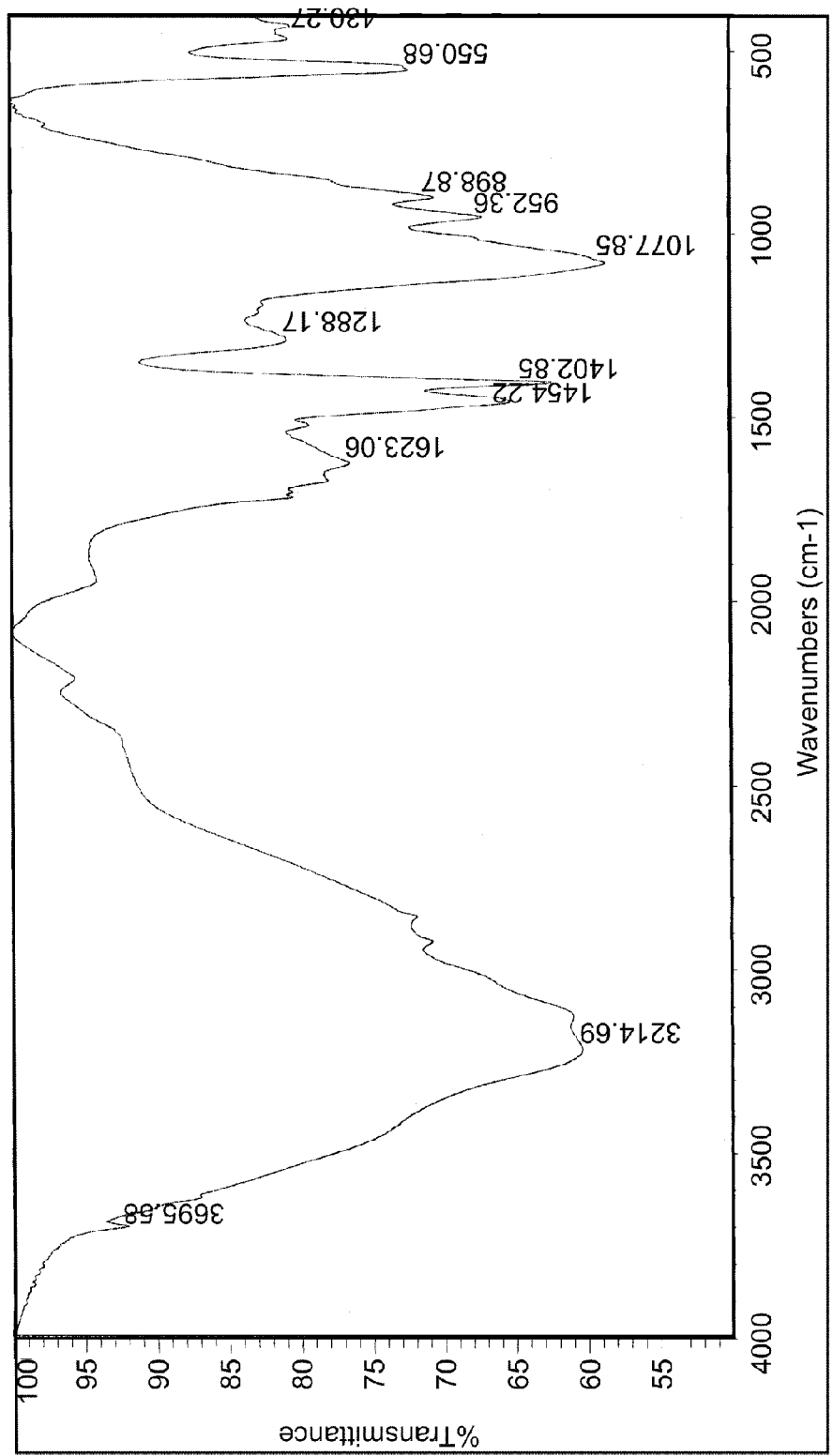
FIGS. 11A and 11B: P2O5:N=27/13 AFTER (Example 9), (Type) 12A and 12B: P2O5:N=38/18 AFTER (Example 10), (Type)
Figure 11B:
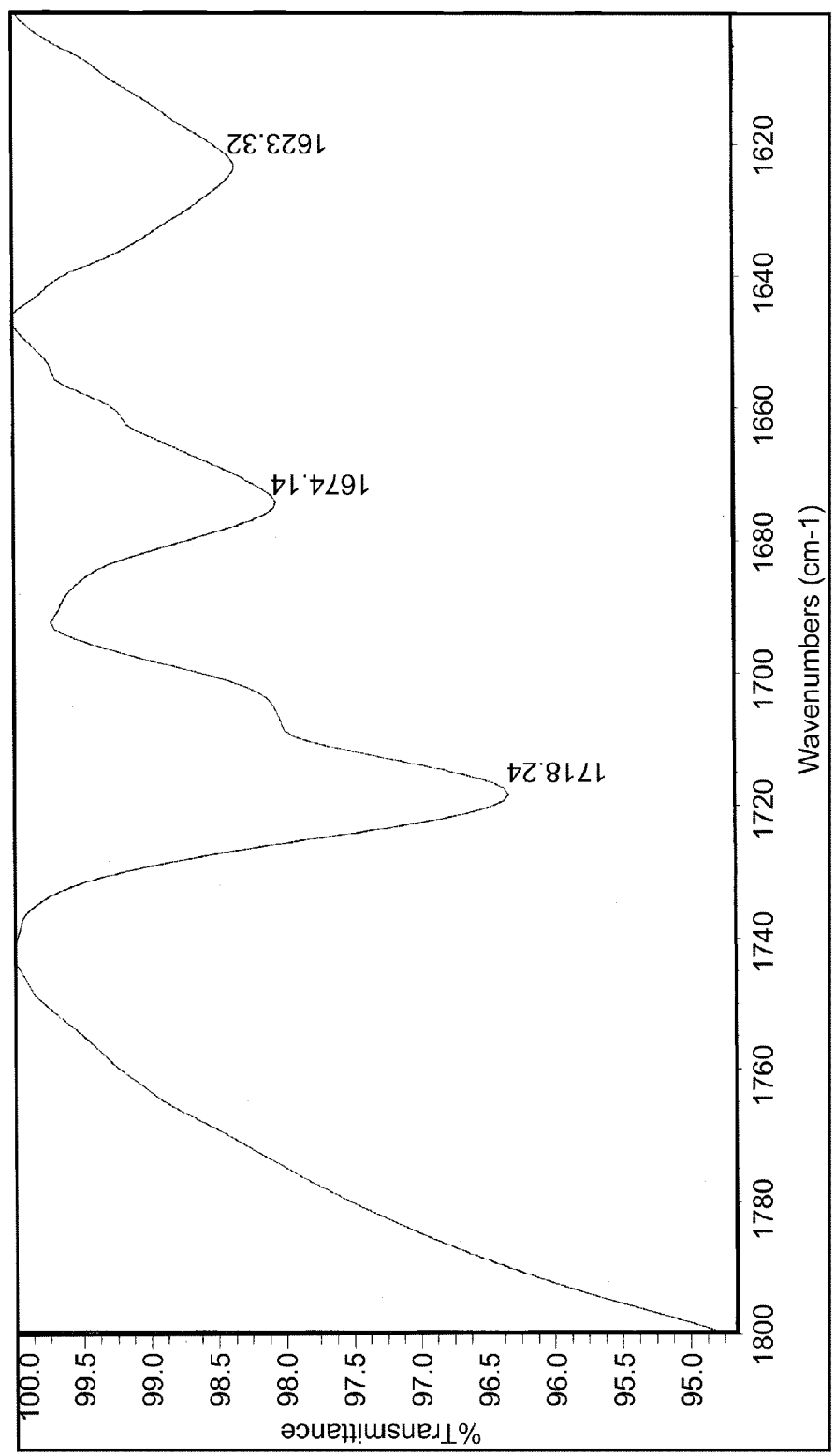

On Sheet 16 of 45 (FIG. 10A), at Line 13 (y-axis), please change "46" to --76--.

On Sheet 20 of 45 (FIG. 12A), at Line 13 (y-axis), please change "46" to --76--.

In the Specification

Figure 12A:
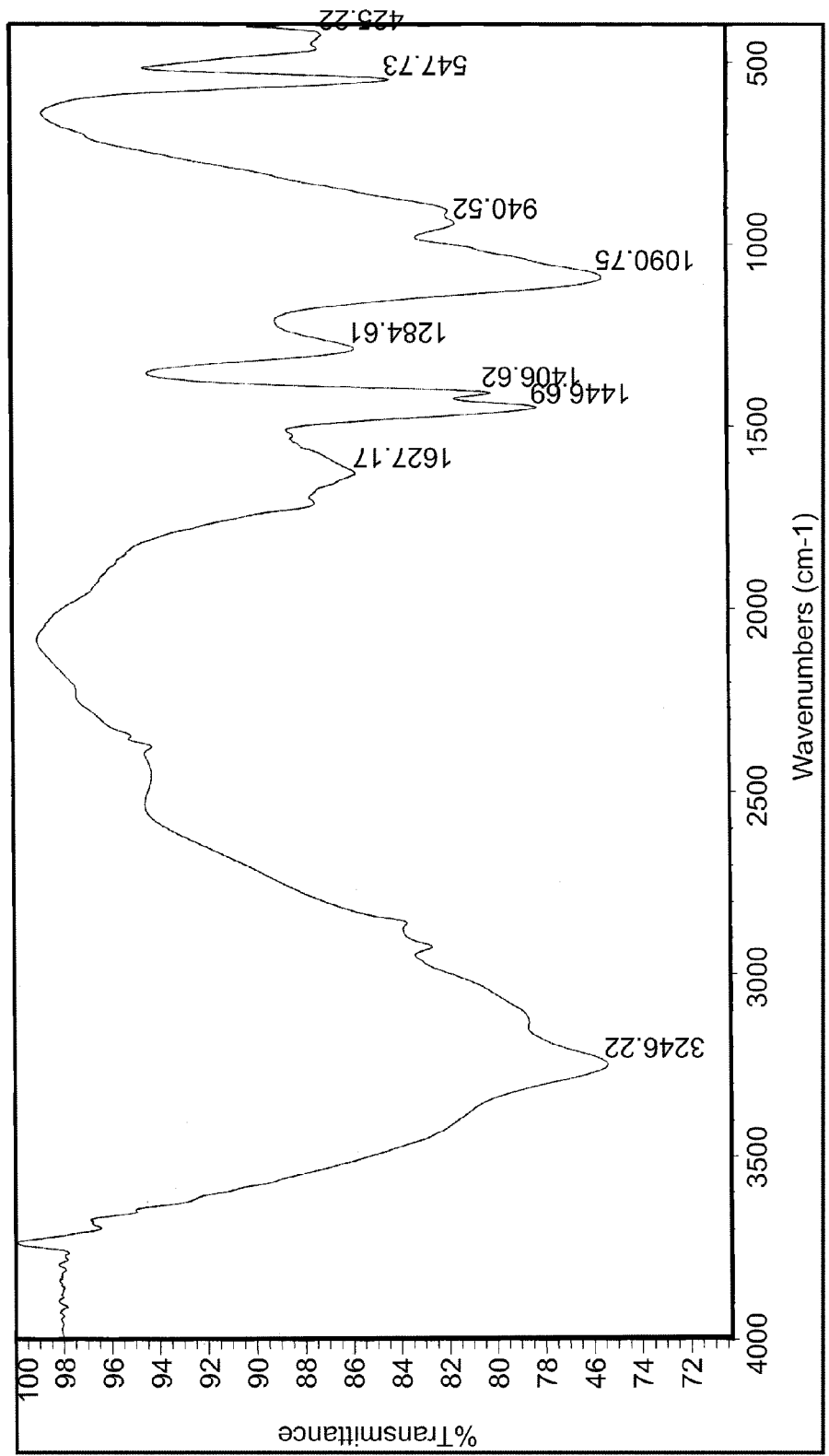
Figure 12B:
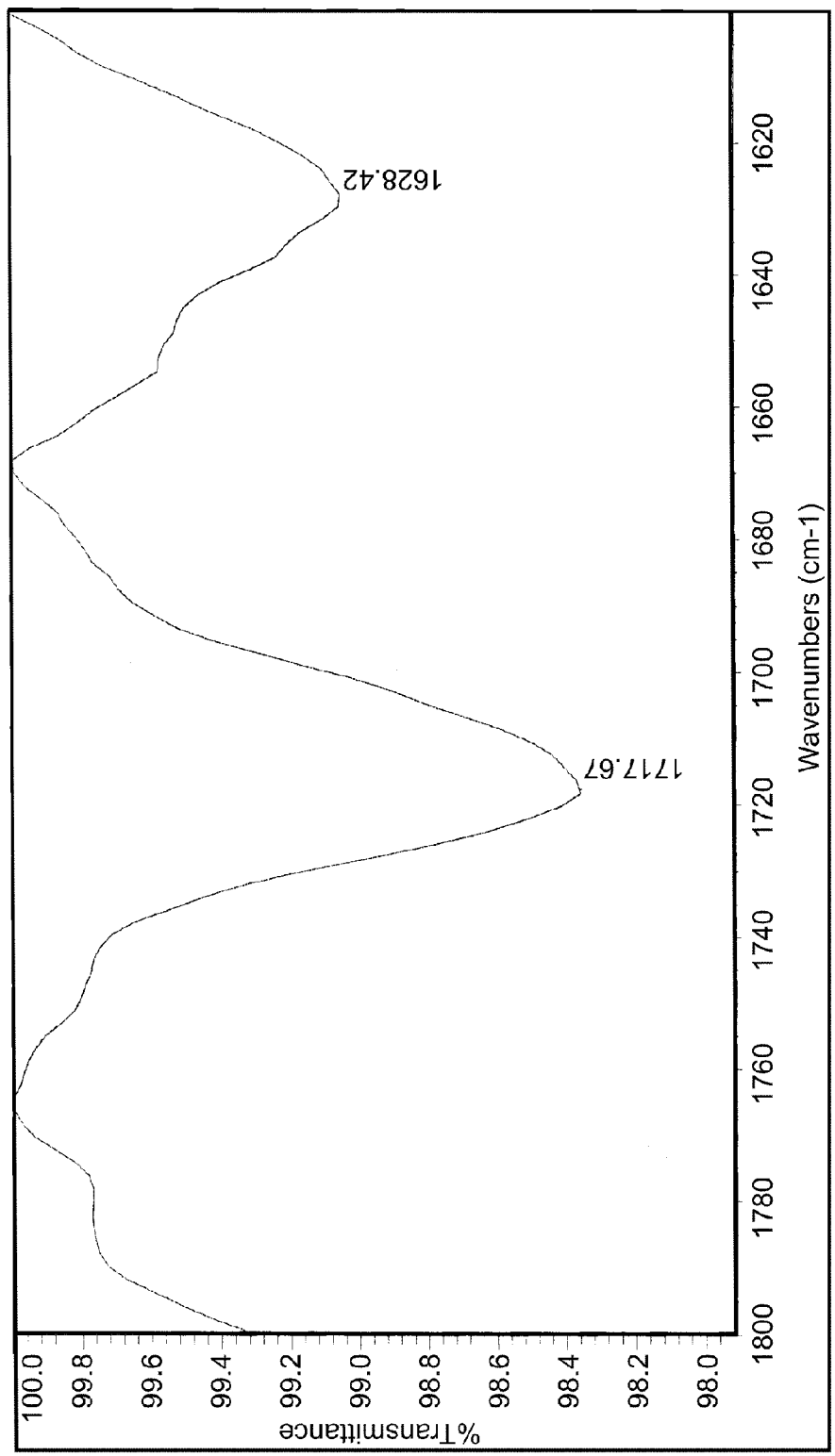
Figure 13A:
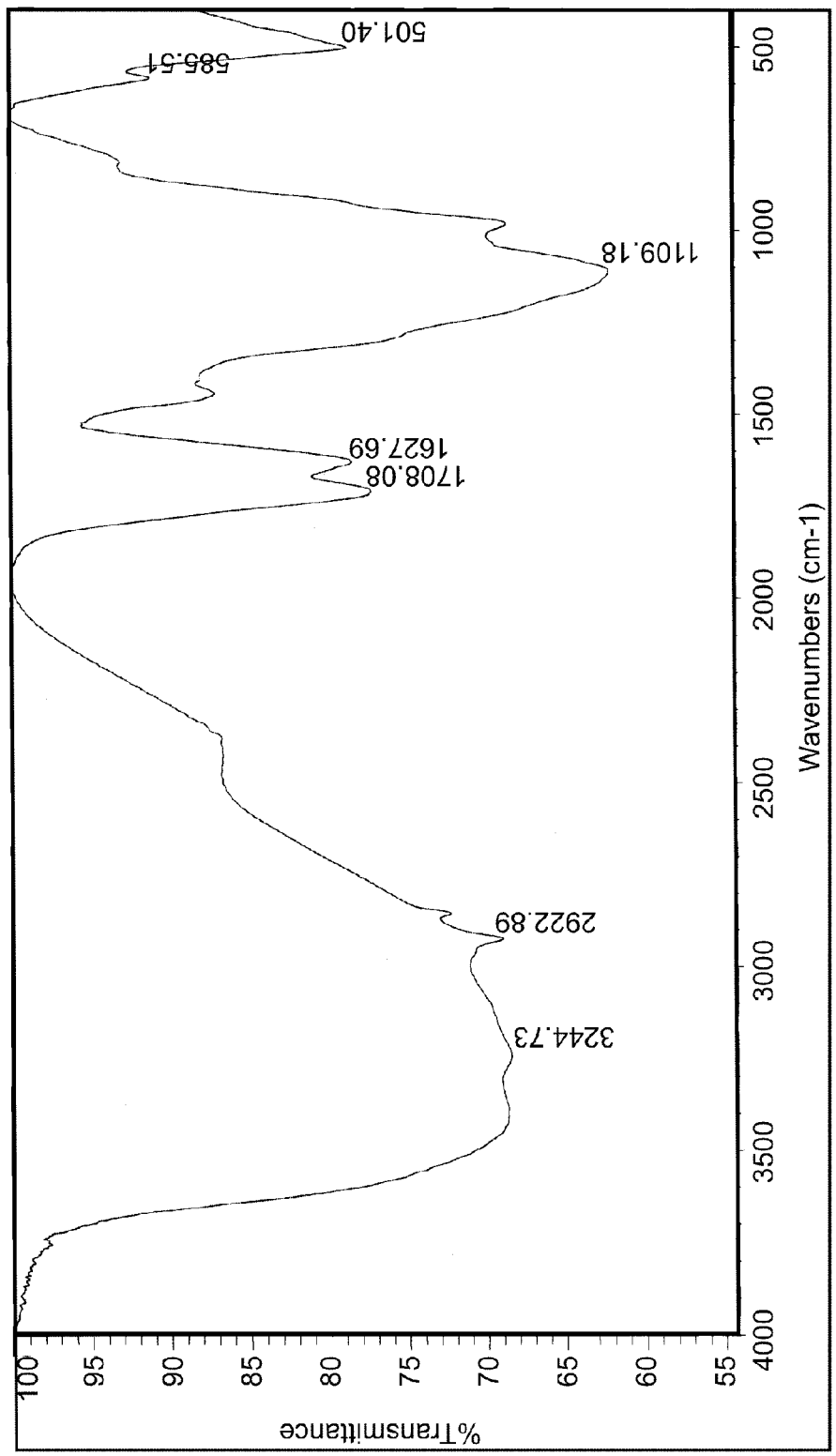
FIGS. 13A and 13B: ORGANIC SSP 18% (Example 4).
Figure 13B:
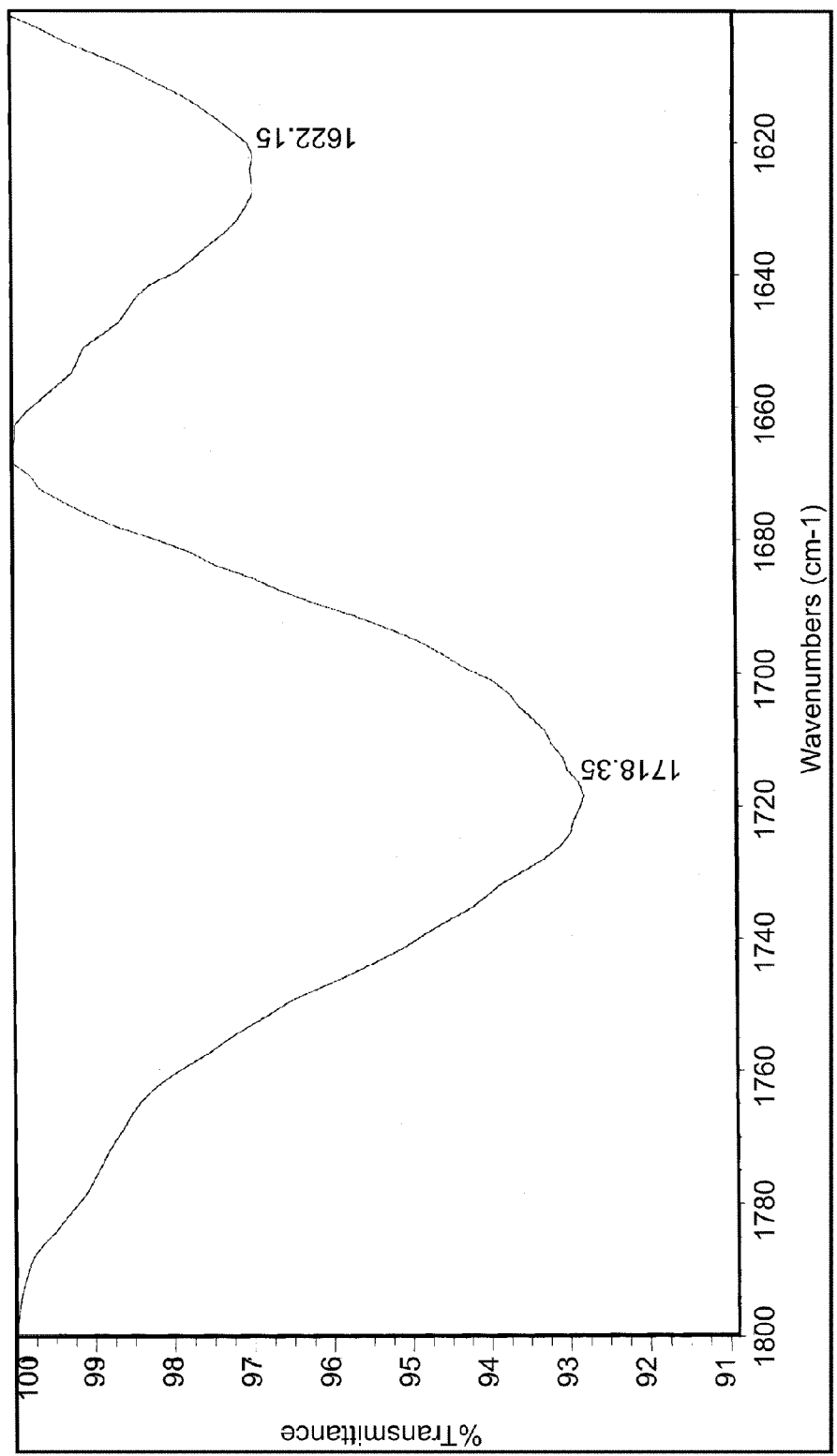
Figure 14A:
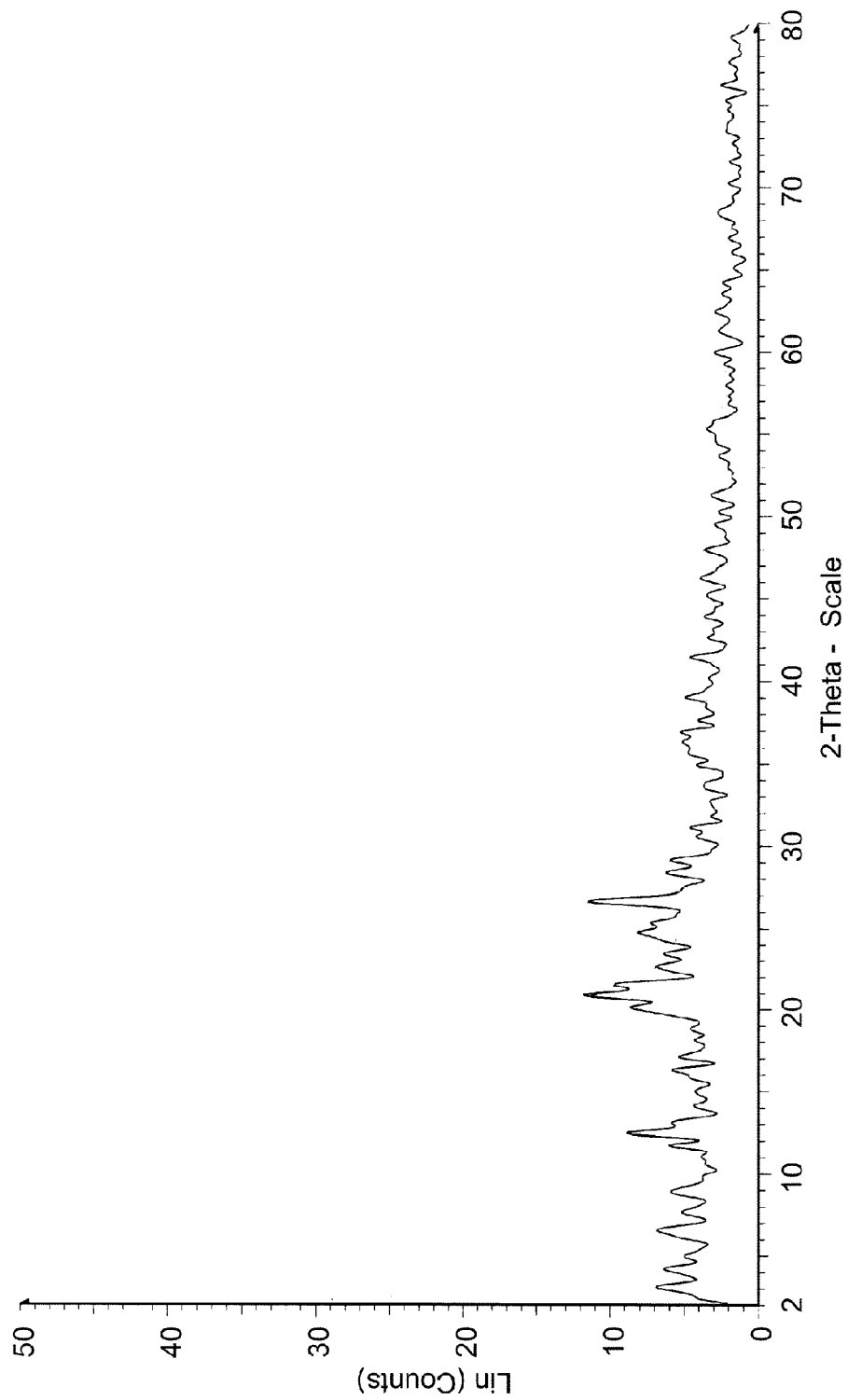
Figure 15A:
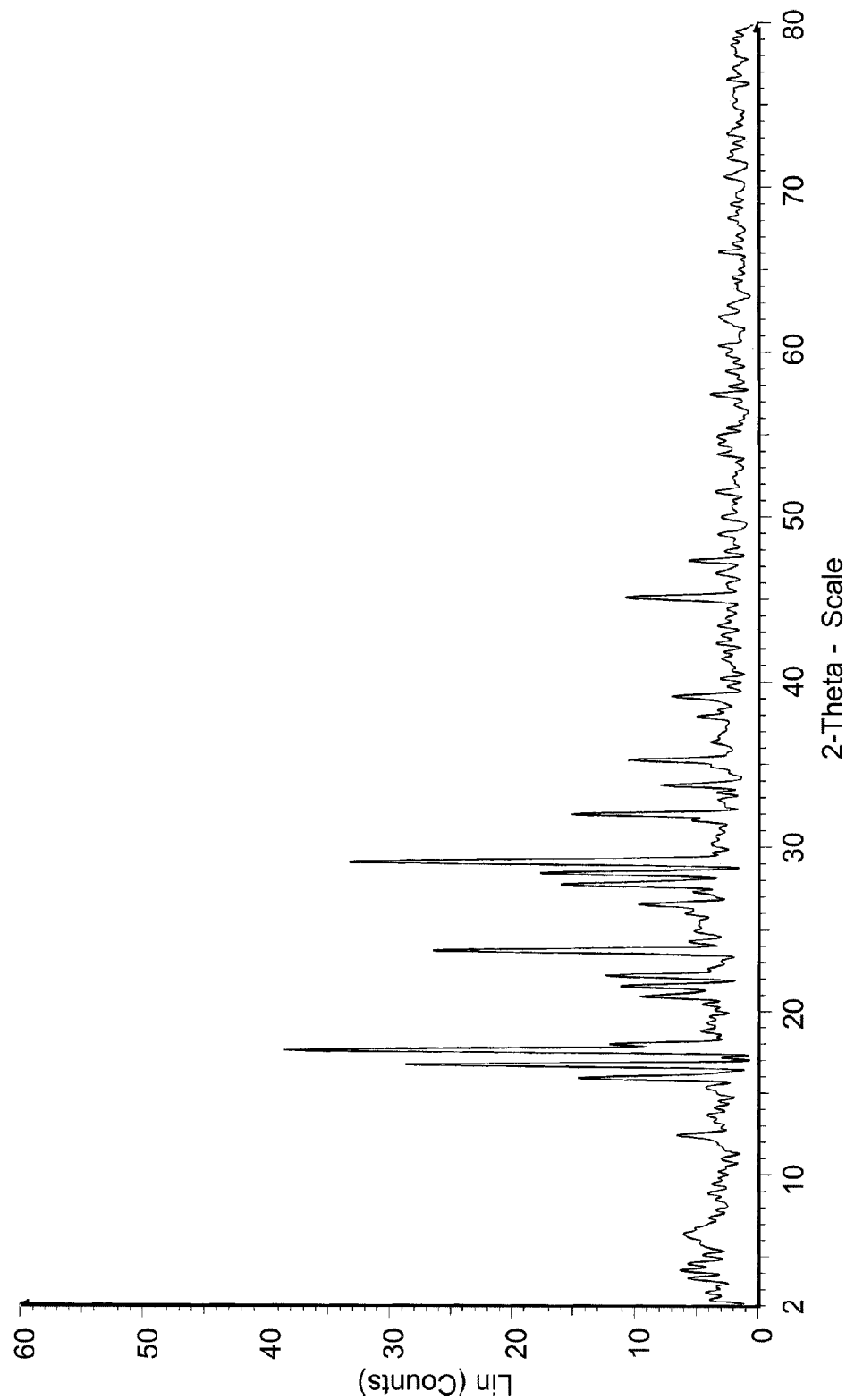
Figure 16A:
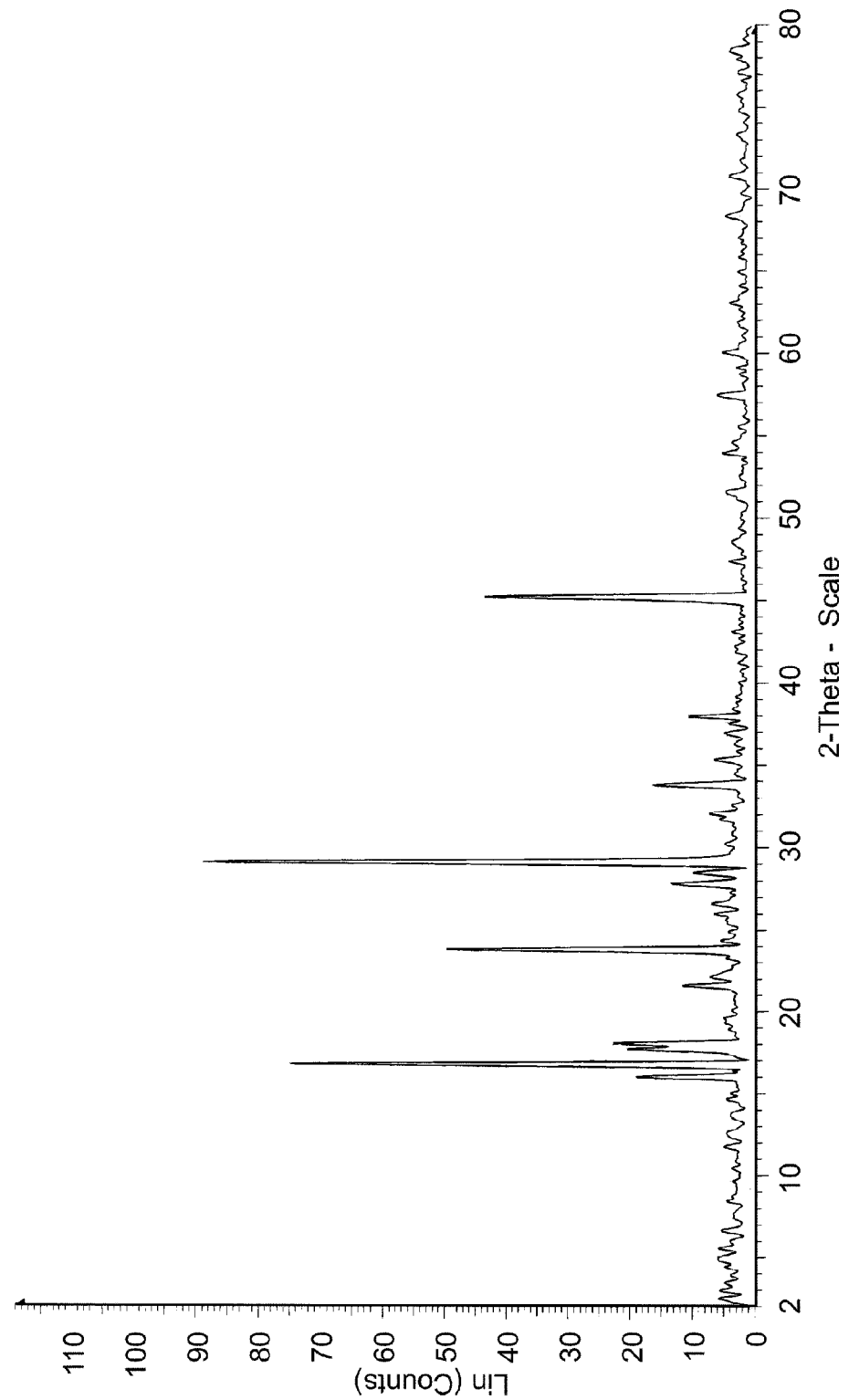
Figure 17A:
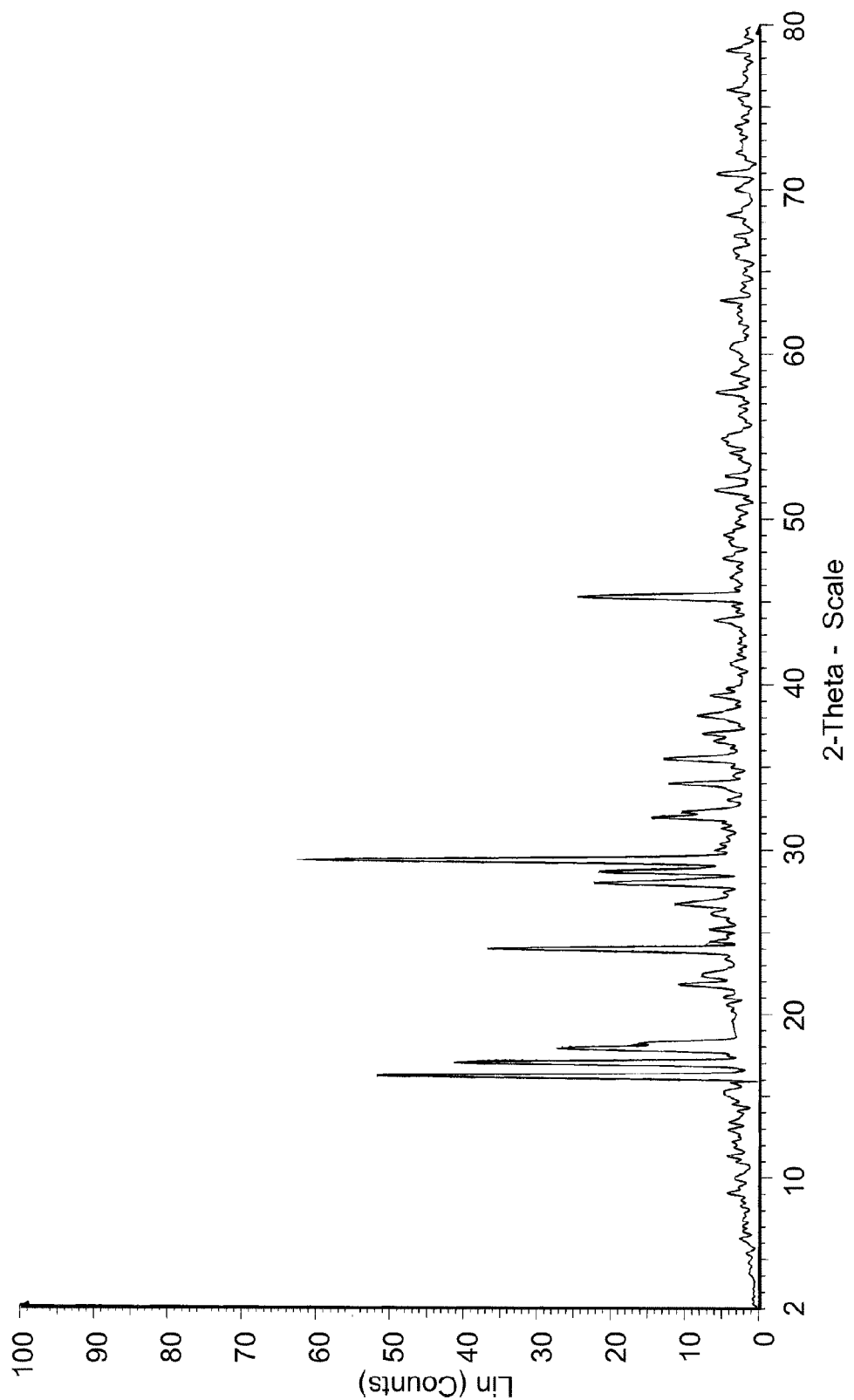
Figure 18A:
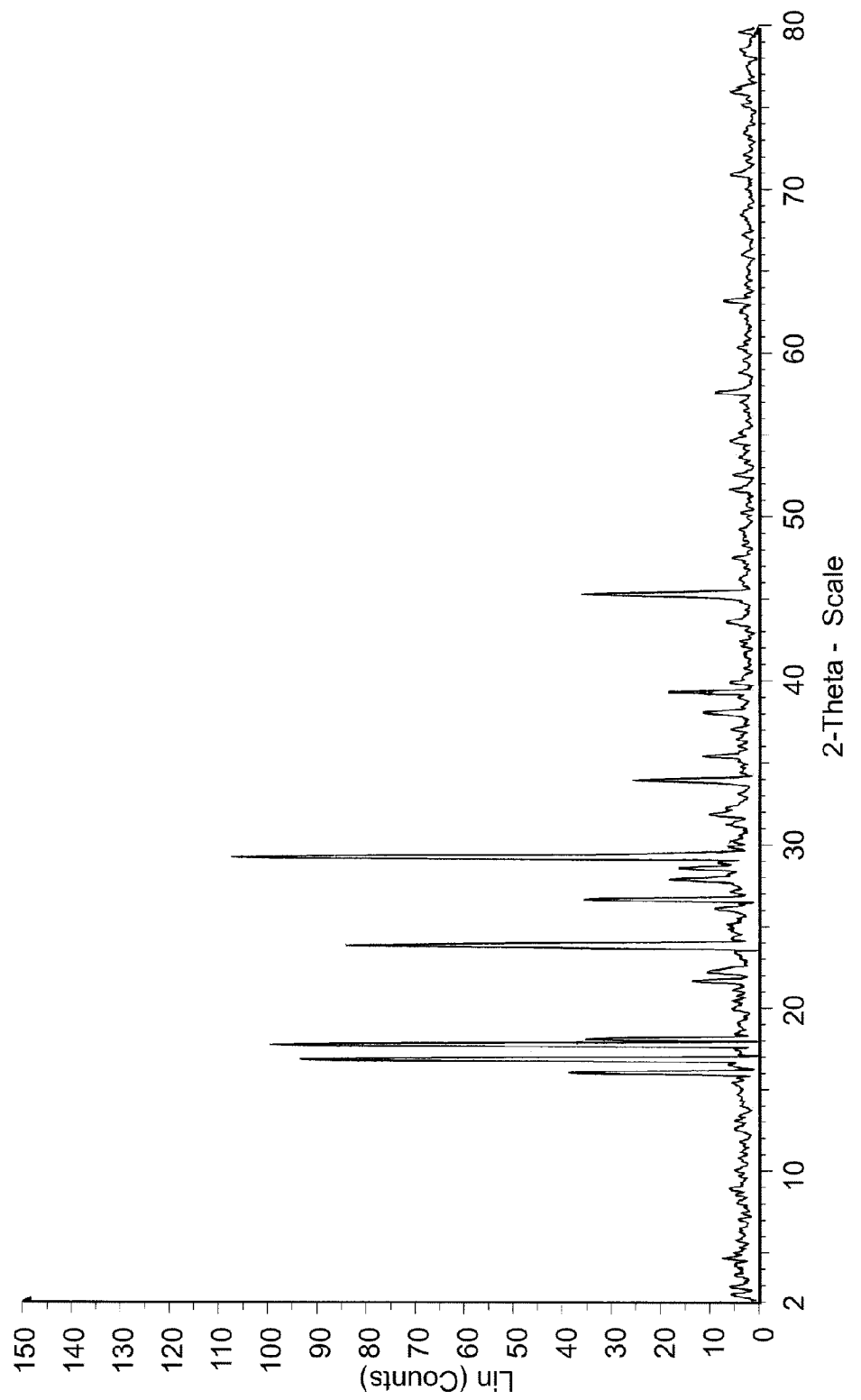
Figure 19A:
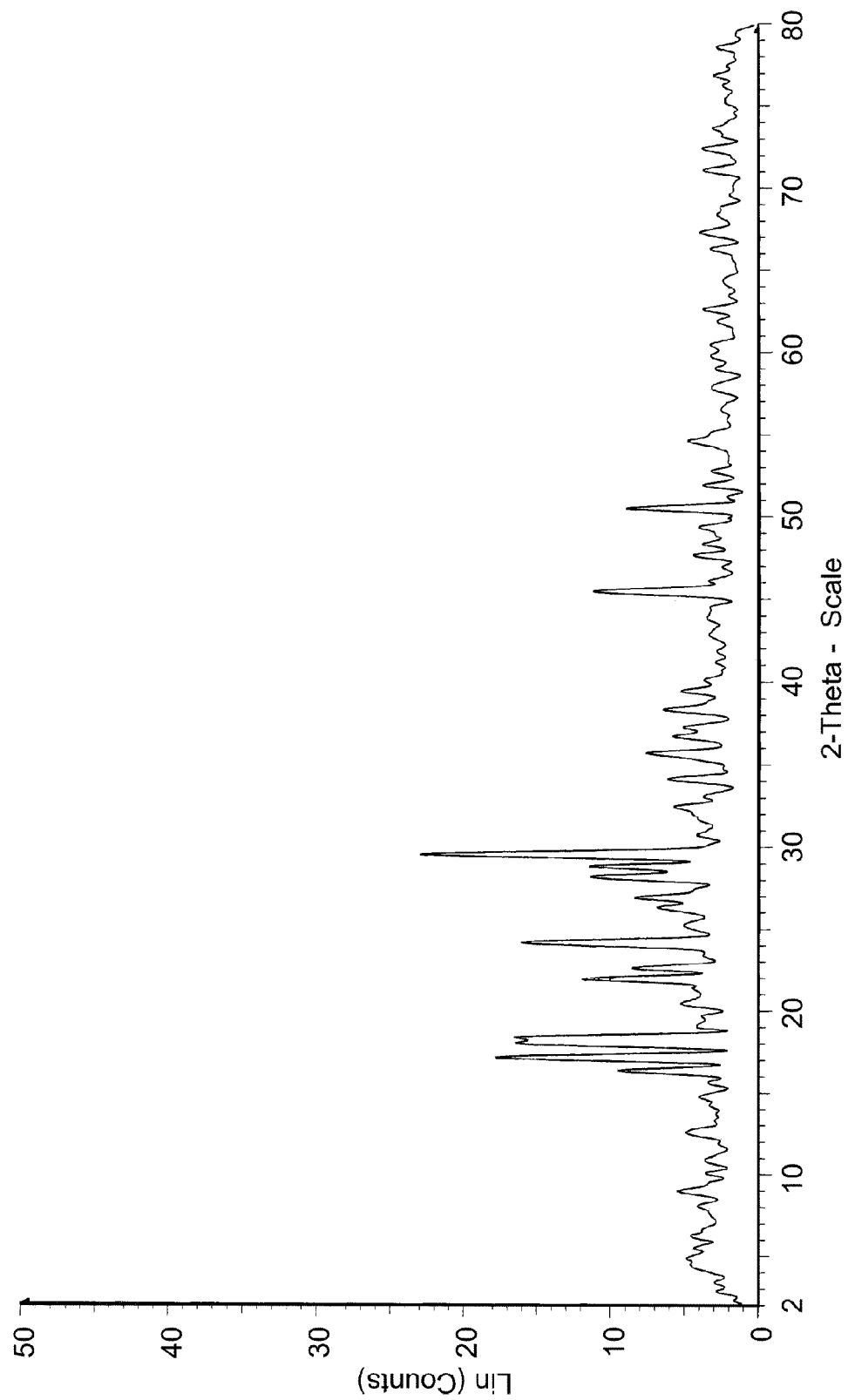
Figure 20A:
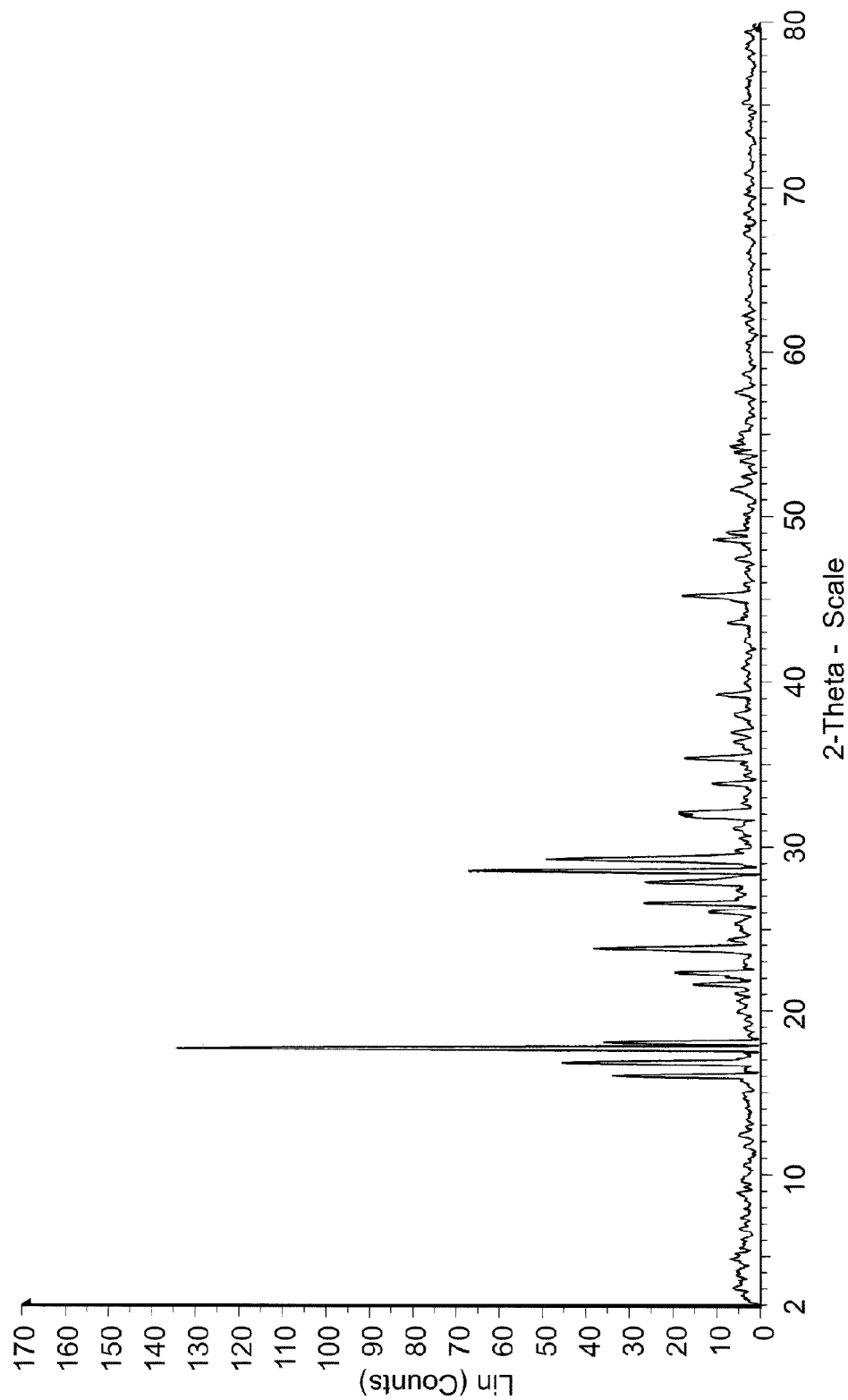
Figure 21A:
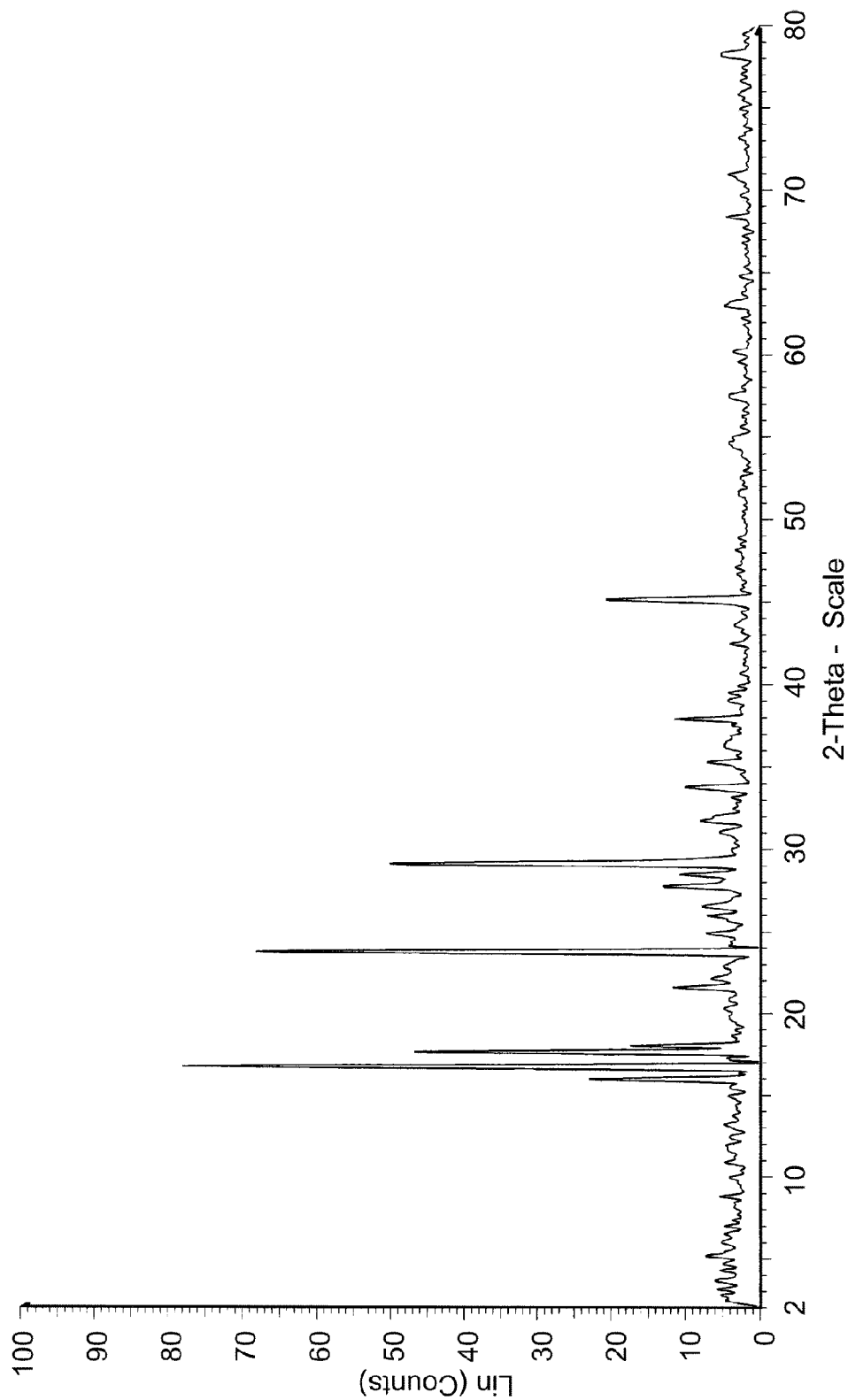
Figure 22A:
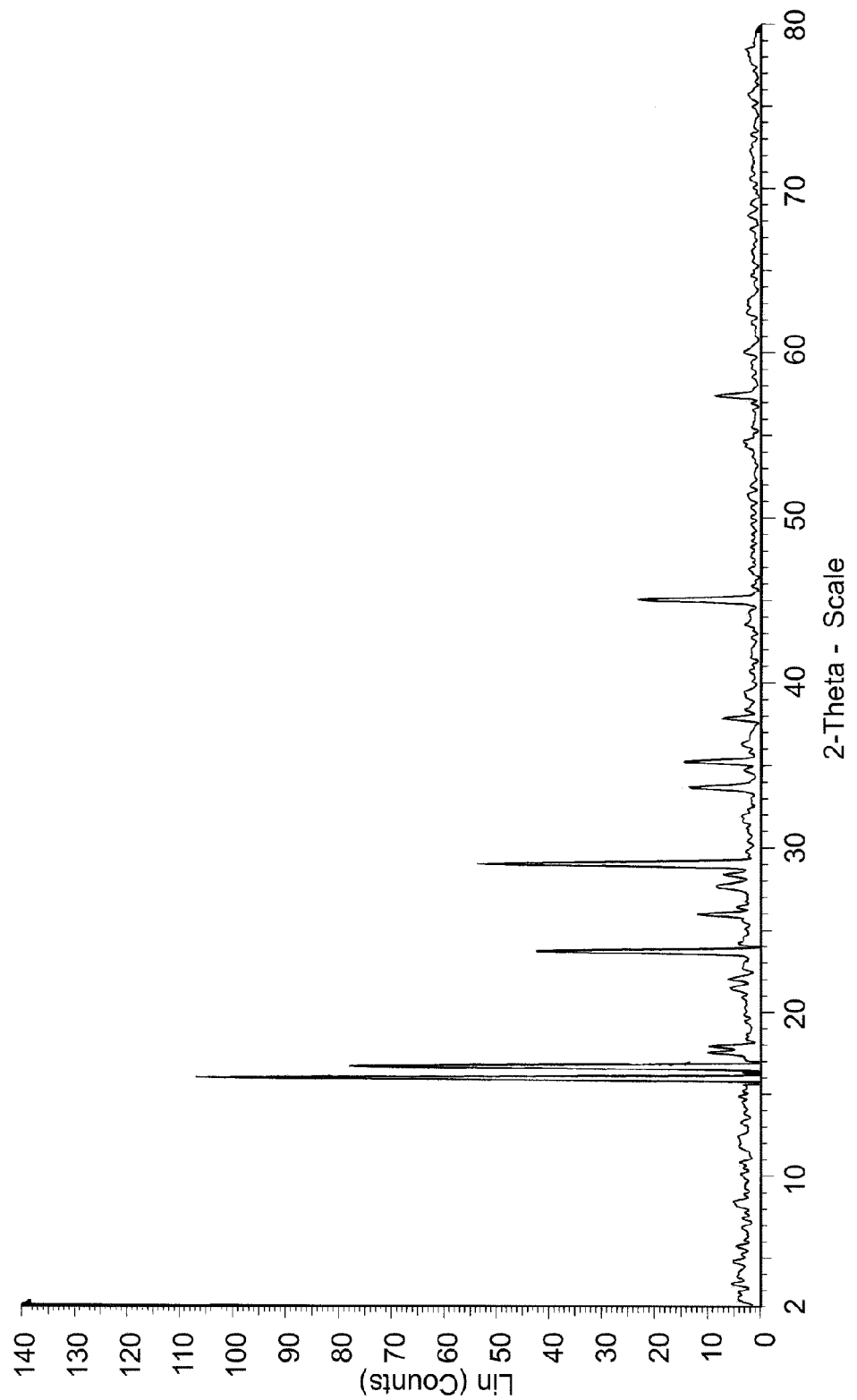
Figure 23A:
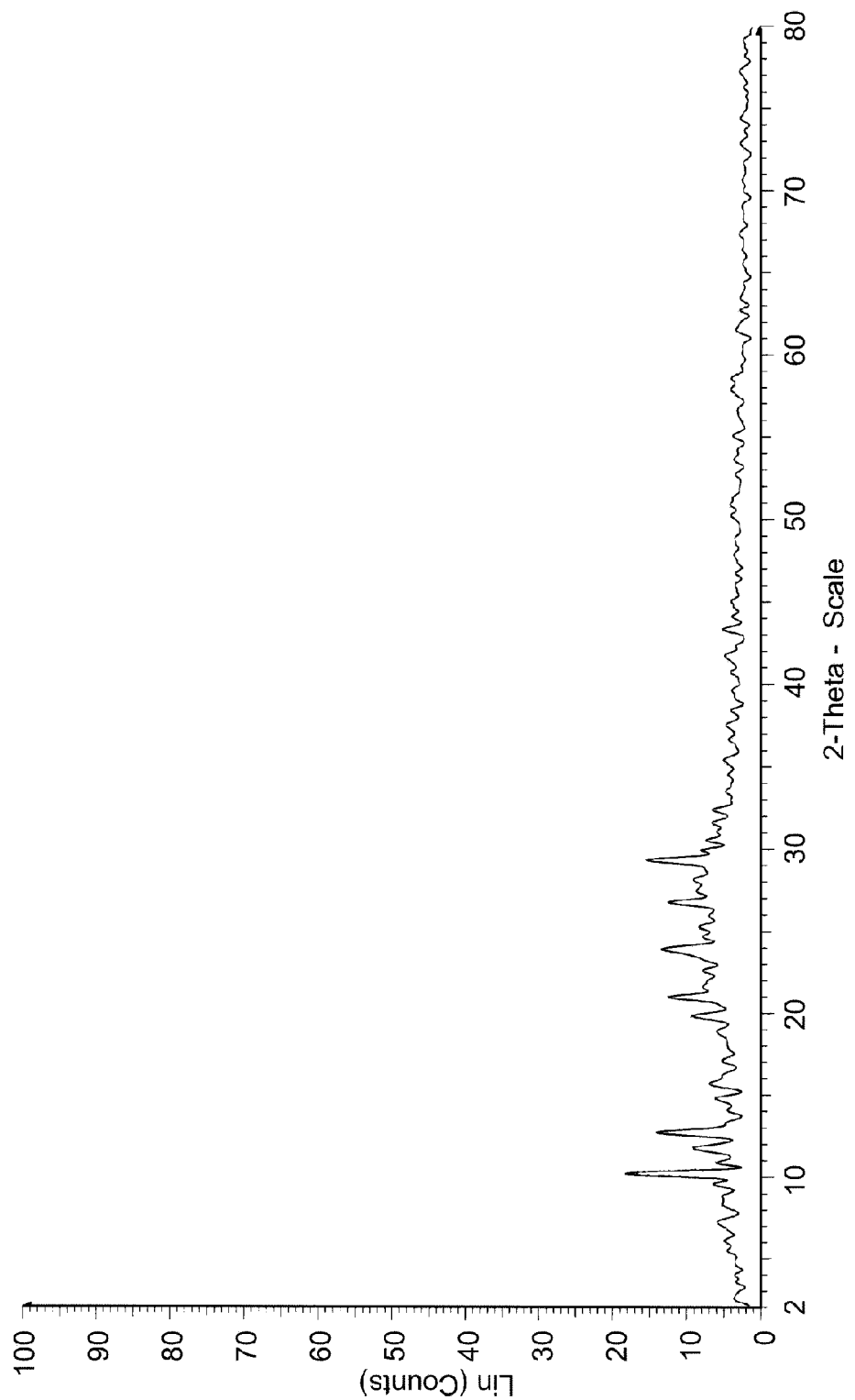
Figure 25:
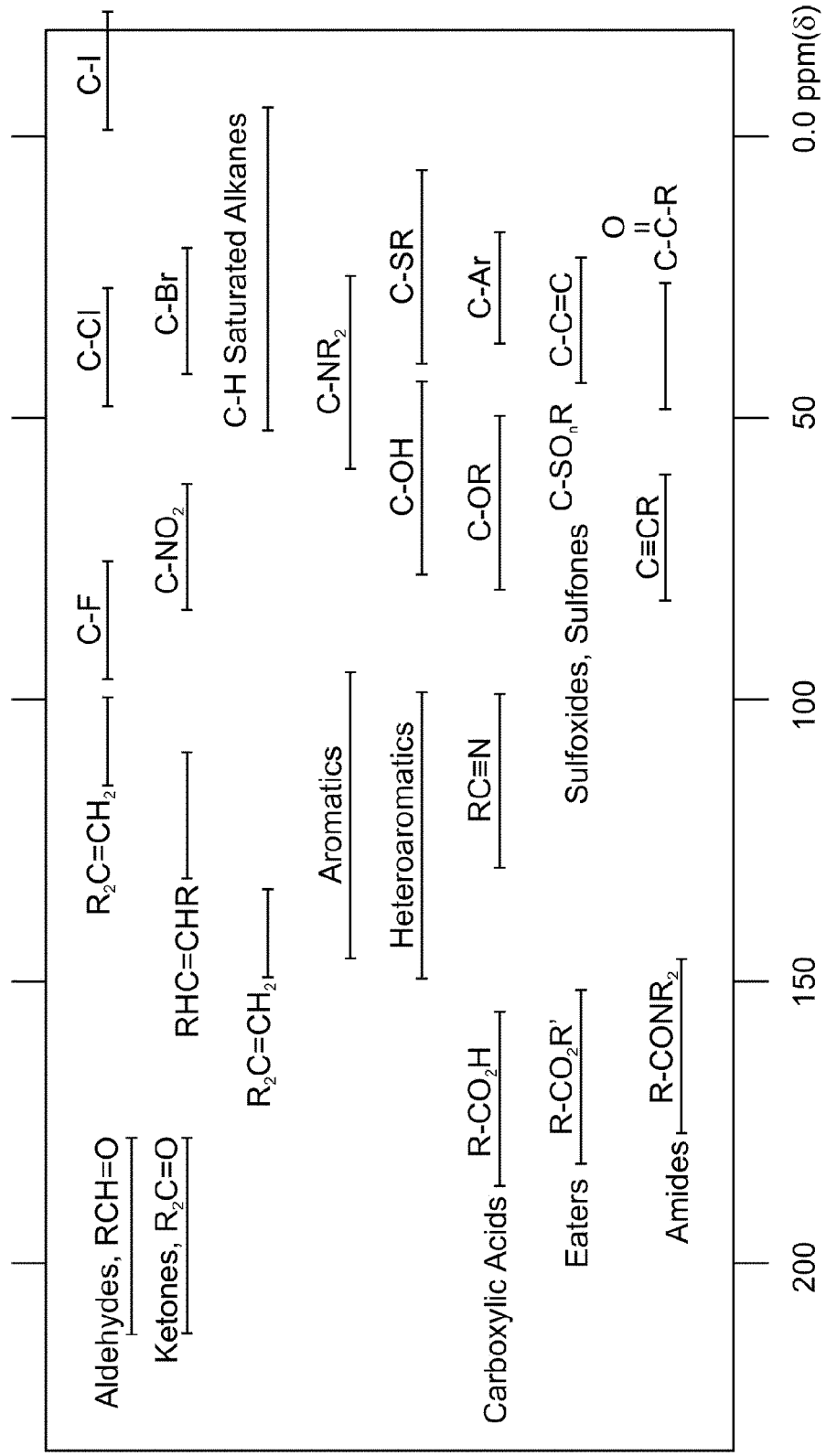
FIG. 25 provides ppm (δ) values for various bonds that can be determined using NMR.

At Column 2, Line 39, please change "12A" to --FIGS. 12A--.

In the Claims

At Column 10, Line 38, in Claim 10, please change "water," to --water;--.

Signed and Sealed this
Eleventh Day of February, 2014

Michelle K. Lee
*Deputy Director of the United States Patent and Trademark Office*